(12) United States Patent
Kimura

(10) Patent No.: US 10,645,700 B2
(45) Date of Patent: *May 5, 2020

(54) COMMUNICATION APPARATUS AND A METHOD FOR COMMUNICATION

(71) Applicant: SONY CORPORATION, Tokyo (JP)

(72) Inventor: Ryota Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,834

(22) Filed: Dec. 17, 2018

(65) Prior Publication Data

US 2019/0124644 A1 Apr. 25, 2019

Related U.S. Application Data

(63) Continuation of application No. 15/551,210, filed as application No. PCT/JP2016/050034 on Jan. 4, 2016, now Pat. No. 10,194,447.

(30) Foreign Application Priority Data

Mar. 31, 2015 (JP) .................................. 2015-072405

(51) Int. Cl.
*H04W 72/04* (2009.01)
*H04W 72/08* (2009.01)
(Continued)

(52) U.S. Cl.
CPC ........... *H04W 72/048* (2013.01); *H04J 11/00* (2013.01); *H04L 5/0005* (2013.01);
(Continued)

(58) Field of Classification Search
CPC .............. H04W 72/048; H04W 72/04; H04W 72/0453; H04W 72/0473; H04W 72/082;
(Continued)

(56) References Cited

U.S. PATENT DOCUMENTS 8,630,655 B2 1/2014 Al Housami
10,194,447 B2 * 1/2019 Kimura .................... H04J 11/00
(Continued)

FOREIGN PATENT DOCUMENTS

CN 104321990 A 1/2015
JP 2003-78419 A 3/2003
(Continued)

OTHER PUBLICATIONS

International Search Report dated Feb. 23, 2016 in PCT/JP2016/050034 filed Jan. 4, 2016.
(Continued)

*Primary Examiner* — Mohamed A Kamara
(74) *Attorney, Agent, or Firm* — Xsensus LLP

(57) ABSTRACT

[Object] To further reduce a burden of scheduling in non-orthogonal multiple access.
[Solution] Provided is an apparatus including: a selection unit configured to select a frequency band to which non-orthogonal multiple access is applied and at least one layer among a plurality of layers that are to be multiplexed in the frequency band for the non-orthogonal multiple access, as a band and a layer to be used for transmission to a terminal device; and a notification unit configured to notify the terminal device of the frequency band and the at least one layer.

20 Claims, 30 Drawing Sheets

(51) Int. Cl.
*H04L 5/00* (2006.01)
*H04J 11/00* (2006.01)

(52) U.S. Cl.
CPC .......... *H04L 5/0016* (2013.01); *H04L 5/0044* (2013.01); *H04L 5/0094* (2013.01); *H04W 72/04* (2013.01); *H04W 72/0453* (2013.01); *H04W 72/0473* (2013.01); *H04L 5/0014* (2013.01); *H04W 72/082* (2013.01)

(58) Field of Classification Search
CPC ... H04L 5/0044; H04L 5/0094; H04L 5/0016; H04L 5/0005; H04L 5/0014; H04J 11/00
See application file for complete search history.

(56) References Cited

U.S. PATENT DOCUMENTS

| | | | |
|---|---|---|---|
| 2009/0318183 | A1 | 12/2009 | Hugl et al. |
| 2010/0265813 | A1* | 10/2010 | Pereira .............. H04W 28/0231 370/201 |
| 2012/0213167 | A1 | 8/2012 | Xu et al. |
| 2012/0213196 | A1 | 8/2012 | Chung et al. |
| 2012/0218954 | A1 | 8/2012 | Barbieri et al. |
| 2012/0327878 | A1 | 12/2012 | Pedersen et al. |
| 2014/0044091 | A1 | 2/2014 | Kishiyama |
| 2014/0050279 | A1 | 2/2014 | Kishiyama |
| 2015/0208403 | A1 | 7/2015 | Takeda et al. |
| 2015/0282185 | A1 | 10/2015 | Nikopour et al. |
| 2017/0339709 | A1* | 11/2017 | Zhang .................. H04B 7/0671 |
| 2018/0070274 | A1 | 3/2018 | Ode |
| 2018/0124684 | A1 | 5/2018 | Kwon et al. |

FOREIGN PATENT DOCUMENTS

| | | |
|---|---|---|
| JP | 2003-229835 A | 8/2003 |
| JP | 2009-545193 A | 12/2009 |
| JP | 2012-531101 A | 12/2012 |
| JP | 2013-179559 A | 9/2013 |
| JP | 2013-247513 A | 12/2013 |
| JP | 2014-86783 A | 5/2014 |
| JP | 2014-511060 A | 5/2014 |
| JP | 2014-204277 A | 10/2014 |
| JP | 2015-39221 A | 2/2015 |
| WO | 2012/161082 A1 | 11/2012 |
| WO | 2013/176042 A1 | 11/2013 |
| WO | 2014/024964 A1 | 2/2014 |
| WO | 2015/025847 A1 | 2/2015 |

OTHER PUBLICATIONS

Nagisa Otao, et al., "Performance of Transmission Power Allocation for Non-orthogonal Access with SIC in Cellular Downlink," Institute of Electronics, Information, and Communication Engineers, Sep. 11-14, 2012, (with English translation), (5 pages).

Nobuhide Nonaka, et al., "Non-orthogonal Multiple Access Using Intra-beam Superposition Coding and SIC in Base Station Cooperative MIMO Cellular Downlink," Vehicular Technology Conference (VTC Fall), 2014 IEEE 80th , Sep. 14-17, 2014, (7 pages).

European Search Report dated Oct. 25, 2018, issued in European Patent Application No. 16771804.8.

Justification for NOMA in New Study on 1-15 Enhanced Multi-User Transmission and Network Assisted Interference Cancellation for LTE NTT DOCOMO, Inc, 3GPP Draft; RP-141936 Justification for NOMA, 3rd Generation Partnership Project (3GPP), Mobile Competence Centre ; 650, Route Des Lucioles ; F-06921 Sophia-Antipolis Cedex; France, vol. TSG RAN, No. Maui, USA; Dec. 8, 2014-Dec. 11, 2014 Dec. 2, 2014 (Dec. 2, 2014), XP050898641, Retrieved from the Internet: URL: http://www.3gpp.org/ftp/Meetings_3GPP_SYNC/RAN/Docs/ [retrieved on Dec. 2, 2014].

Huawei et al: "RAN2 considerations for 1-15 D2D communication", 3GPP Draft; R2-132757 RAN2 Considerations for D2D Communication, 3rd Generation Artnership Project (3GPP), Mobile Competence Centre ; 650, Route Des Lucioles ; F-06921 Sophia-Antipolis Cedex ; France vol. RAN W@2, No. Barcelona, Spain; Aug. 19, 2013-Aug. 23, 2013 Aug. 12, 2013 (Aug. 12, 2013), XP050718591, Retrieved from the Internet: URL:http://www.3gpp.org/ftp/tsg_ran/WG2_RL2/TSGR2_83/Docs/ [retrieved on Aug. 12, 2013].

Extended European Search Report dated Oct. 25, 2018 issued in corresponding EP Application No. 16771804.8, 12 pages.

Notification of First Office Action dated Oct. 22, 2018 issued in corresponding Chinese Application No. 201680017526.8 (21 pages) with English translation.

Japanese Office Action dated Feb. 25, 2020, issued in corresponding Japanese Patent Application No. 2017509305.

Takahiro Hirano et al., TDM Based Reference Signal Multiplexing for Faster-than-Nyquist Signaling Using OFDM/OQAM, Technical Research Report of Institute of Electronics, Information and Communication Engineers, Aug. 12, 2014, vol. 114, No. 180, pp. 85-90.

Motorola, E-UTRA Numerology and Frame Structure, 3GPP TSG-RAN WG1#46R1-062059, 2006, 3 pp.

* cited by examiner

COMMUNICATION APPARATUS AND A METHOD FOR COMMUNICATION

CROSS-REFERENCE TO RELATED APPLICATIONS

This application is a continuation of U.S. patent application Ser. No. 15/551,210, filed on Aug. 15, 2017, which is a National Stage Entry of International Patent Application No. PCT/JP2016/050034, filed on Jan. 4, 2016, and claims priority to Japanese Patent Application 2015-072405, filed in the Japanese Patent Office on Mar. 31, 2015, the entire contents of which is hereby incorporated herein by reference in its entirety.

TECHNICAL FIELD

The present invention relates to an apparatus.

BACKGROUND ART

Non-orthogonal multiple access (NOMA) has been attracting attention as a radio access technology (RAT) for a fifth generation (5G) mobile communication system following Long Term Evolution (LTE)/LTE-Advanced (LTE-A). In orthogonal frequency-division multiple access (OFDMA) and simile-carrier frequency-division multiple access (SC-FDMA), which are adopted in LTE, radio resources (e.g., resource blocks) are allocated to users without overlap. These schemes are called orthogonal multiple access. In contrast, in non-orthogonal multiple access, radio resources are allocated to users with overlap. In non-orthogonal multiple access, signals of users interfere with each other, but a signal for each user is taken out by a high-accuracy decoding process at the reception side. Non-orthogonal multiple access, in theory, achieves higher cell communication capability than orthogonal multiple access.

One of radio access technologies classified into non-orthogonal multiple access is superposition coding (SPC) multiplexing/multiple access. SPC is a scheme in which signals to which different levels of power are allocated are multiplexed on at least partly overlapping radio resources in frequency and time. At the reception side, interference cancellation and/or iterative detection is performed for reception/decoding of signals multiplexed on the same radio resource.

For example, PTLs 1 and 2 disclose, as SPC or a technology equivalent to SPC, techniques for setting an amplitude (or power) that allows appropriate demodulation/decoding. Moreover, for example, PTL 3 discloses a technique for enhancing successive interference cancellation (SIC) for reception of multiplexed signals.

CITATION LIST

Patent Literature

Patent Literature 1: JP 2003-78419A
Patent Literature 2: JP 2003-229835A
Patent Literature 3: JP 2013-247513A

DISCLOSURE OF INVENTION

Technical Problem

When a plurality of layers are multiplexed in the same radio resources for non-orthogonal multiple access, it is necessary for a terminal device to ascertain a layer on which a signal destined for the terminal device is to be transmitted. However, deciding a layer on which a signal destined for the terminal device is to be transmitted each time a signal is transmitted may cause a burden of processing of a base station to increase. In addition, notifying the terminal device of the layer on which the signal destined for the terminal device is to be transmitted may cause a burden to increase in terms of waste of radio resources as well. In other words, a burden of scheduling of non-orthogonal multiple access may increase.

Therefore, it is desirable to provide a mechanism for further reducing a burden of scheduling in non-orthogonal multiple access.

Solution to Problem

According to the present disclosure, there is provided an apparatus including: a selection unit configured to select a frequency band to which non-orthogonal multiple access is applied and at least one layer among a plurality of layers that are to be multiplexed in the frequency band for the non-orthogonal multiple access, as a band and a layer to be used for transmission to a terminal device; and a notification unit configured to notify the terminal device of the frequency band and the at least one layer.

In addition, according to the present disclosure, there is provided a method that is performed by a processor, the method including: selecting a frequency band to which non-orthogonal multiple access is applied and at least one layer among a plurality of layers that are to be multiplexed in the frequency band for the non-orthogonal multiple access, as a band and a layer to be used for transmission to a terminal device; and notifying the terminal device of the frequency band and the at least one layer.

In addition, according to the present disclosure, there is provided an apparatus including: an acquisition unit configured to acquire band information indicating a frequency band that is a frequency band to which non-orthogonal multiple access is applied and selected as a band to be used for transmission to a terminal device, and layer information indicating at least one layer which is at least one layer among a plurality of layers that are to be multiplexed in the frequency band for the non-orthogonal multiple access and selected as a layer to be used for transmission to the terminal device; and a reception processing unit configured to decode a signal to be transmitted on the at least one layer in the frequency band.

Advantageous Effects of Invention

According to the present disclosure described above, it is possible to further reduce a burden of scheduling in non-orthogonal multiple access. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
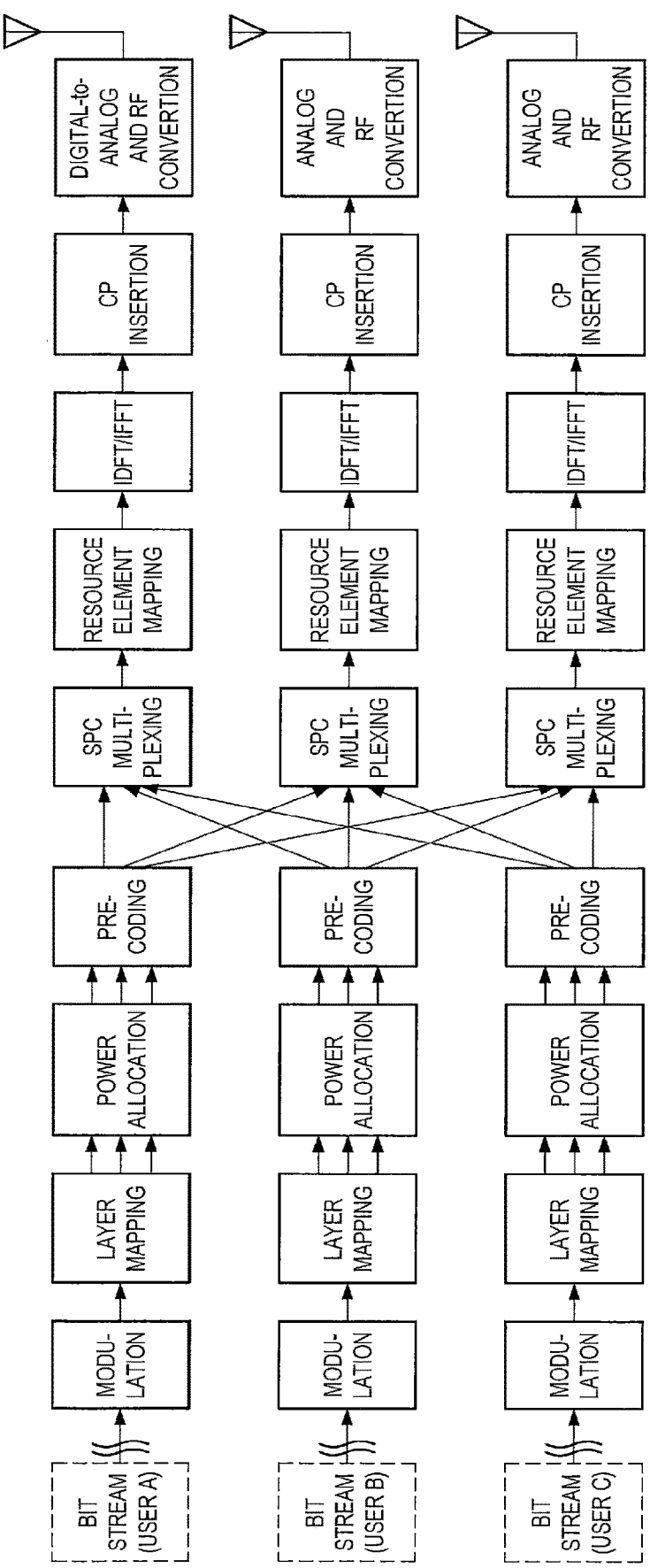
FIG. 1 is a first explanatory diagram for explaining an example of a process in a transmission device that supports SPC.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. SPC
2. Schematic configuration of system
3. Configuration of each device
3.1. Configuration of base station
3.2. Configuration of terminal device
4. Technical features
5. Process flow
6. Modified example
7. Another embodiment
7.1. Technical problem
7.2. Technical features
8. Application
8.1. Application example with regard to base station
8.2. Application example with regard to terminal device
9. Conclusion

<<1. SPC>>

Figure 2:
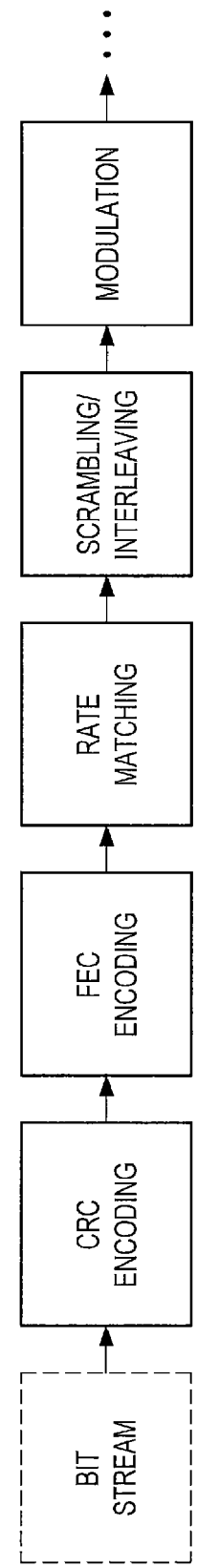
FIG. 2 is a second explanatory diagram for explaining an example of a process in a transmission device that supports SPC.
Figure 3:
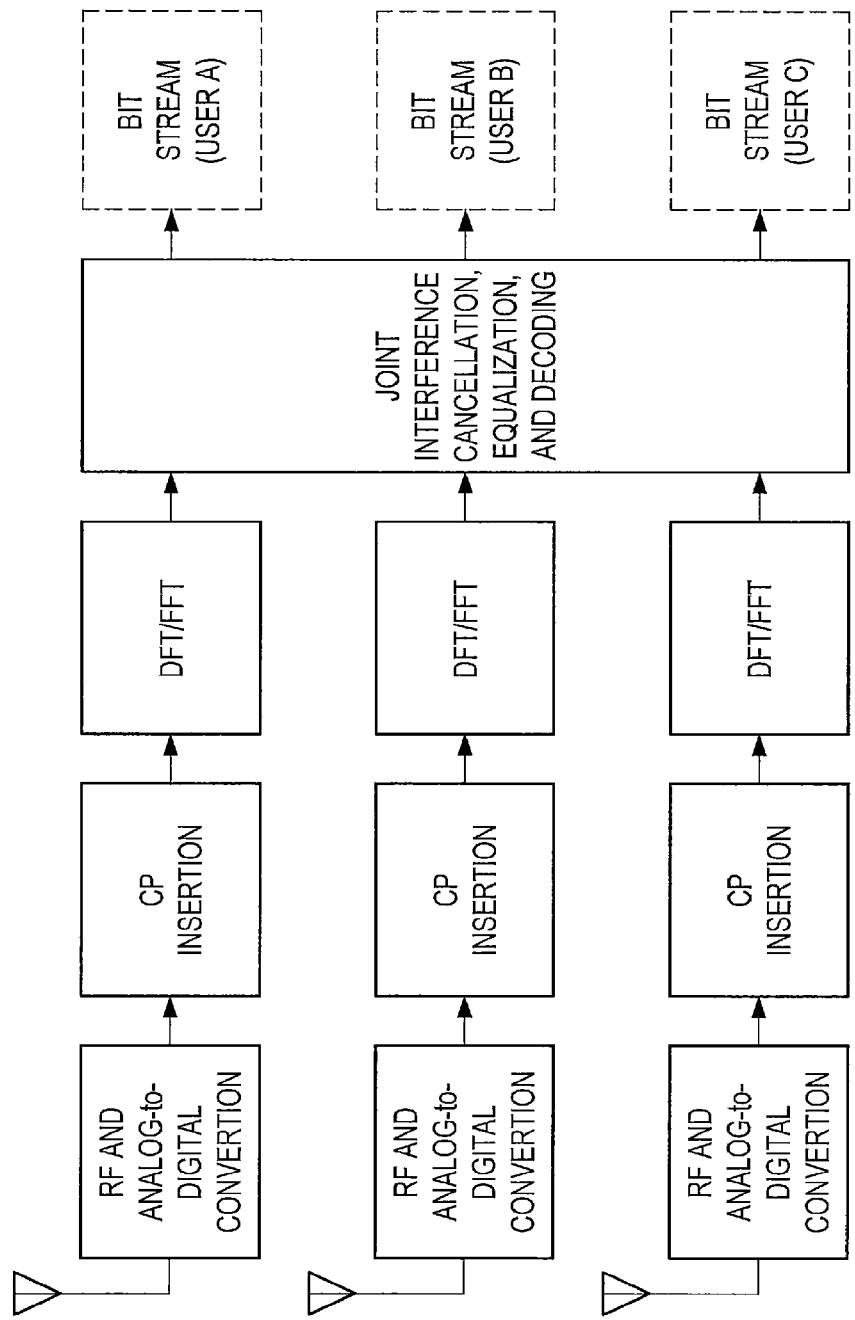
FIG. 3 is an explanatory diagram for explaining an example of a process in a reception device that performs interference cancellation.

Firstly described with reference to FIGS. 1 to 3 are processes and signals of SPC.

(a) Process in Transmission Device

FIGS. 1 and 2 are explanatory diagrams for explaining an example of a process in a transmission device that supports SPC. According to FIG. 1, for example, bit streams (e.g., transport blocks) of a user A, a user B, and a user C are processed. For each of these bit streams, some processes (e.g., cyclic redundancy check (CRC) encoding, forward error correction (FEC) encoding, rate matching, and scrambling/interleaving, as illustrated in FIG. 2) are performed and then modulation is performed. Further, layer mapping, power allocation, precoding, SPC multiplexing, resource element mapping, inverse discrete Fourier transform (IDFT)/inverse fast Fourier transform (IFFT), cyclic prefix (CP) insertion, digital-to-analog and radio frequency (RF) conversion, and the like are performed.

In particular, in power allocation, power is allocated to signals of the user A, the user B, and the user C, and in SPC multiplexing, the signals of the user A, the user B, and the user C are multiplexed.

(b) Process in Reception Device

FIG. 3 is an explanatory diagram for explaining an example of a process in a reception device that performs interference cancellation. According to FIG. 4, for example, RF and analog-to-digital conversion, CP removal, discrete Fourier transform (DFT)/fast Fourier transform (FFT), joint interference cancellation, equalization, decoding, and the like are performed. This provides bit streams (e.g., transport blocks) of the user A, the user B, and the user C.

(2) Transmission Signals and Reception Signals (a) Downlink

Next, downlink transmission signals and reception signals when SPC is adopted will be described. Assumed here is a multi-cell system of heterogeneous network (HetNet), small cell enhancement (SCE), or the like.

An index of a cell to be in connection with a target user u is denoted by i, and the number of transmission antennas of a base station corresponding to the cell is denoted by $N_{TX,i}$. Each of the transmission antennas may also be called a transmission antenna port. A transmission signal from the cell i to the user u can be expressed in a vector form as below.

$$s_{i,u} = \begin{bmatrix} s_{i,u,0} \\ \vdots \\ s_{i,u,N_{TX,i}-1} \end{bmatrix} = W_{i,u} P_{i,u} x_{i,u} \quad \text{[Math. 1]}$$

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,i}-1,0} & \cdots & w_{i,u,N_{TX,i}-1,N_{SS,u}-1} \end{bmatrix} \quad \text{[Math. 2]}$$

$$P_{i,u} = \begin{bmatrix} P_{i,u,0,0} & \cdots & P_{i,u,0,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix} \quad \text{[Math. 3]}$$

$$x_{i,u} = \begin{bmatrix} x_{i,u,0} \\ \vdots \\ x_{i,u,N_{SS,u}-1} \end{bmatrix} \quad \text{[Math. 4]}$$

In the above expressions, $N_{SS,u}$ denotes the number of spatial transmission streams for the user u. Basically, $N_{SS,u}$ is a positive integer equal to or less than $N_{TX,i}$. A vector $x_{i,u}$ is a spatial stream signal to the user u. Elements of this vector basically correspond to digital modulation symbols of phase shift keying (PSK), quadrature amplitude modulation (QAM), or the like. A matrix $W_{i,u}$ is a precoding matrix for the user u. An element in this matrix is basically a complex number, but may be a real number.

A matrix $P_{i,u}$ is a power allocation coefficient matrix for the user u in the cell i. In this matrix, each element is preferably a positive real number. Note that this matrix may be a diagonal matrix (i.e., a matrix whose components excluding diagonal components are zero) as below.

$$P_{i,u} = \begin{bmatrix} P_{i,u,0,0} & 0 & \cdots & 0 \\ 0 & P_{i,u,1,1} & \ddots & \vdots \\ \vdots & \ddots & \ddots & 0 \\ 0 & \cdots & \cdots & P_{i,u,N_{SS,u}-1,N_{SS,u}-1} \end{bmatrix} \quad \text{[Math. 5]}$$

If adaptive power allocation for a spatial stream is not performed, a scalar value $P_{i,u}$ may be used instead of the matrix $P_{i,u}$.

As well as the user u, another user v is present in the cell i, and a signal $s_{i,v}$ of the other user v is also transmitted on the same radio resource. These signals are multiplexed using SPC. A signal $s_i$ from the cell i after multiplexing is expressed as below.

$$s_i = \sum_{u' \in U_i} s_{i,u'} \quad \text{[Math. 6]}$$

In the above expression, $U_i$ denotes a set of users for which multiplexing is performed in the cell i. Also in a cell j (a cell that serves as an interference source for the user u) other than a serving cell of the user u, a transmission signal $s_j$ is generated similarly. Such a signal is received as interference at the user side. A reception signal $r_u$ of the user u can be expressed as below.

$$r_u = \begin{bmatrix} r_{u,0} \\ \vdots \\ r_{u,N_{RX,u}-1} \end{bmatrix} = \sum_{i'} H_{u,i'} s_{i'} + n_u \quad \text{[Math. 7]}$$

$$H_{u,i} = \begin{bmatrix} h_{u,i,0,0} & \cdots & h_{u,i,0,N_{TX,i}-1} \\ \vdots & \ddots & \vdots \\ h_{u,i,N_{RX,u}-1,0} & \cdots & h_{u,i,N_{RX,u}-1,N_{TX,i}-1} \end{bmatrix} \quad \text{[Math. 8]}$$

$$n_u = \begin{bmatrix} n_{u,0} \\ \vdots \\ n_{u,N_{RX,u}-1} \end{bmatrix} \quad \text{[Math. 9]}$$

In the above expressions, a matrix $H_{u,i}$ is a channel response matrix for the cell i and the user u. Each element of the matrix $H_{u,i}$ is basically a complex number. A vector $n_u$ is noise included in the reception signal $r_u$ of the user u. For example, the noise includes thermal noise and interference from another system. The average power of the noise is expressed as below.

$$\sigma_{n,u}^2 \quad \text{[Math. 10]}$$

The reception signal $r_u$ can also be expressed by a desired signal and another signal as below.

$$r_u = H_{u,i} s_{i,u} + H_{u,i} \sum_{v \in U_i, v \neq u} s_{i,v} + \sum_{j \neq i} H_{u,j} \sum_{v \in U_j} s_{j,v} + n_u \quad \text{[Math. 11]}$$

In the above expression, the first term of the right side denotes a desired signal of the user u, the second term, interference in the serving cell i of the user u (called intra-cell interference, multi-user interference, multi-access interference, or the like), and the third term, interference from a cell other than the cell i (called inter-cell interference).

When orthogonal multiple access (e.g., OFDMA or SC-FDMA) or the like is adopted, the reception signal can be expressed as below.

$$r_u = H_{u,i} s_{i,u} + \sum_{j \neq i} H_{u,j} s_{j,v} + n_u \quad \text{[Math. 12]}$$

In orthogonal multiple access, no intra-cell interference occurs, and moreover, in the other cell j, a signal of the other user v is not multiplexed on the same radio resource.

(b) Uplink

Next, uplink transmission signals and reception signals when SPC is adopted will be described. Assumed here is a multi-cell system of HetNet, SCE, or the like. Note that the signs used for downlink will be further used as signs denoting signals and the like.

A transmission signal that the user u transmits in the cell i can be expressed in a vector form as below.

$$s_{i,u} = \begin{bmatrix} s_{i,u,0} \\ \vdots \\ s_{i,u,N_{TX,u}-1} \end{bmatrix} = W_{i,u} P_{i,u} x_{i,u}$$ [Math. 13]

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,u}-1,0} & \cdots & w_{i,u,N_{TX,u}-1,N_{SS,u}-1} \end{bmatrix}$$ [Math. 14]

$$P_{i,u} = \begin{bmatrix} P_{i,u,0,0} & \cdots & P_{i,u,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix}$$ [Math. 15]

$$x_{i,u} = \begin{bmatrix} x_{i,u,0} \\ \vdots \\ x_{i,u,N_{SS,u}-1} \end{bmatrix}$$ [Math. 16]

In the above expressions, the number of transmission antennas is the number of transmission antennas of the user, $N_{TX,u}$. As in downlink, a matrix $P_{i,u}$, which is a power allocation coefficient matrix for the user u in the cell i, may be a diagonal matrix.

In uplink, there is no case where a signal of a user and a signal of another user are multiplexed in the user; thus, a reception signal of a base station of the cell i can be expressed as below.

$$r_i = \begin{bmatrix} r_{i,0} \\ \vdots \\ r_{i,N_{RX,i}-1} \end{bmatrix} = \sum_{i'} \sum_{u' \in U_{i'}} H_{i',u'} s_{i',u'} + n_i$$ [Math. 17]

$$H_{i,u} = \begin{bmatrix} h_{i,u,0,0} & \cdots & h_{i,u,0,N_{TX,u}-1} \\ \vdots & \ddots & \vdots \\ h_{i,u,N_{RX,i}-1,0} & \cdots & h_{i,u,N_{RX,i}-1,N_{TX,u}-1} \end{bmatrix}$$ [Math. 18]

$$n_i = \begin{bmatrix} n_{i,0} \\ \vdots \\ n_{i,N_{RX,i}-1} \end{bmatrix}$$ [Math. 19]

It should be noted that in uplink, unlike in downlink, a base station needs to obtain all signals from a plurality of users in a cell by decoding. Note also that a channel response matrix differs depending on a user.

When a focus is put on a signal transmitted by the user u, among uplink signals in the cell i, a reception signal can be expressed as below.

$$r_{i,u} = \begin{bmatrix} r_{i,u,0} \\ \vdots \\ r_{i,u,N_{RX,i}-1} \end{bmatrix} = H_{i,u} s_{i,u} + \sum_{v \in U_i, v \neq u} H_{i,v} s_{i,v} + \sum_{j \neq i} \sum_{v \in U_j} H_{i,v} s_{j,v} + n_i$$ [Math. 20]

In the above expression, the first term of the right side denotes a desired signal of the user u, the second term, interference in the serving cell i of the user u (called intra-cell interference, multi-user interference, multi-access interference, or the like), and the third term, interference from a cell other than the cell i (called inter-cell interference).

When orthogonal multiple access (e.g., OFDMA or SC-FDMA) or the like is adopted, the reception signal can be expressed as below.

$$r_{i,u} = H_{i,u} s_{i,u} + \sum_{j \neq i} H_{i,v} s_{j,v} + n_i$$ [Math. 21]

In orthogonal multiple access, no intra-cell interference occurs, and moreover, in the other cell j, a signal of the other user v is not multiplexed on the same radio resource.

<<2. Schematic Configuration of System>>

Figure 4:
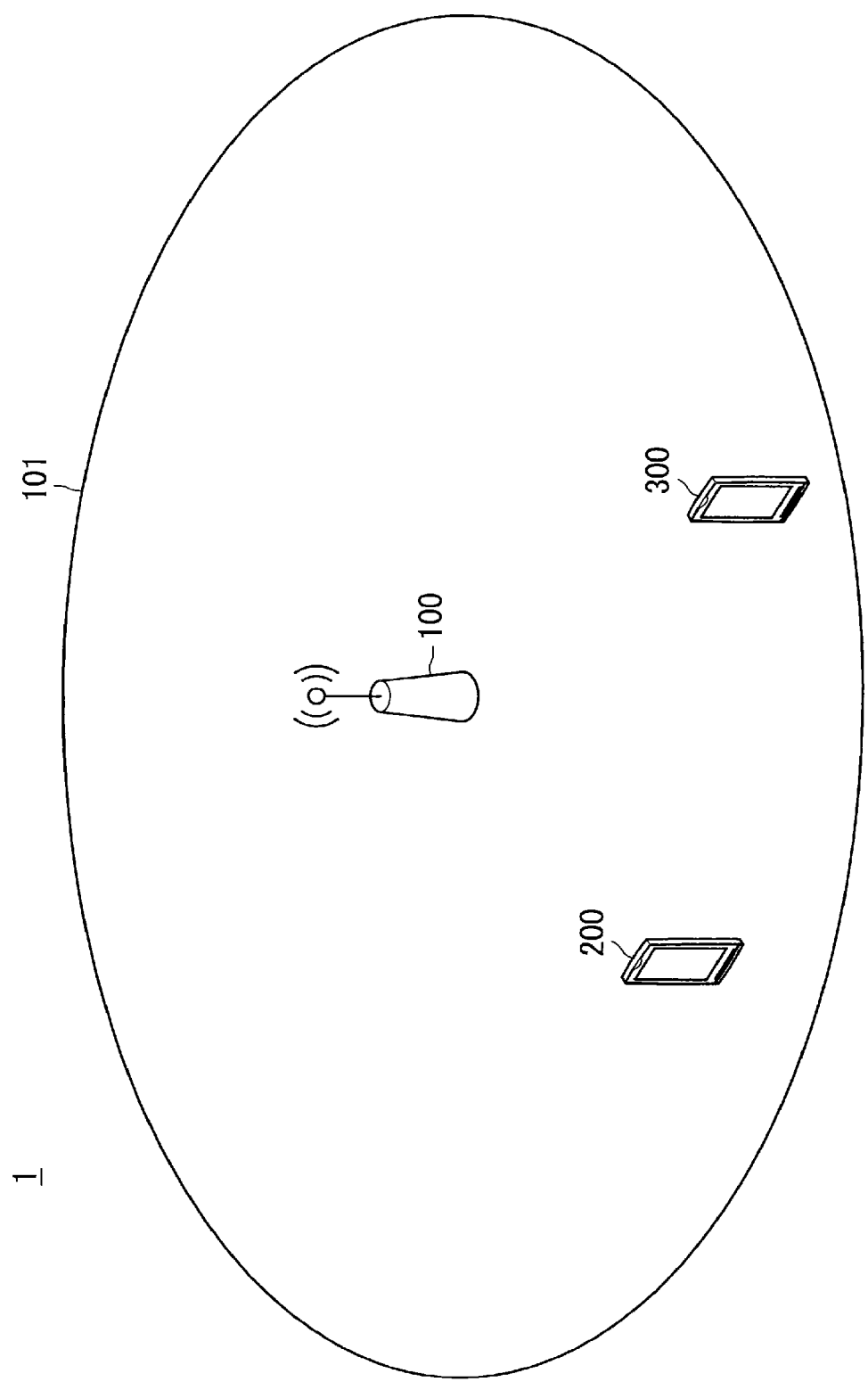
FIG. 4 is an explanatory diagram illustrating an example of a schematic configuration of a system according to an embodiment of the present disclosure.

Next, a schematic configuration of a system 1 according to an embodiment of the present disclosure will be described with reference to FIGS. 4 to 6. FIG. 4 is an illustrative diagram illustrating an example of the schematic configuration of the system 1 according to the embodiment of the present disclosure. Referring to FIG. 4, the system 1 includes a base station 100, a terminal device 200, and a terminal device 300. Here, each of the terminal device 200 and the terminal device 300 is also called a user.

Note that, although only one terminal device 200 and one terminal device 300 are illustrated here for the sake of facilitating understanding, the system 1 can of course include a plurality of terminal devices 200 and/or a plurality of terminal devices 300.

(1) Base Station 100

The base station 100 is a base station of a cellular system (or a mobile communication system). The base station 100 performs radio communication with a terminal device (e.g., each of the terminal device 200 and the terminal device 300) positioned within a cell 101 of the base station 100. The base station 100, for example, transmits a downlink signal to the terminal device, and receives an uplink signal from the terminal device.

In the embodiment of the present disclosure, in particular, the base station 100 supports non-orthogonal multiple access (NOMA) as will be described below.

(2) Terminal Device 200

The terminal device 200 can perform communication in a cellular system (or mobile communication system). The terminal device 200 performs radio communication with a base station (e.g., the base station 100) of the cellular system. For example, the terminal device 200 receives a downlink signal from the base station, and transmits an uplink signal to the base station.

In the embodiment of the present disclosure, in particular, the terminal device 200 supports non-orthogonal multiple access (NOMA) as will be described below. For example, the terminal device 200 can perform interference cancellation (e.g., removing a signal destined for another terminal device by regarding it as an interfering signal). The interference cancellation includes, for example, successive interference cancellation (SIC), parallel interference cancellation (PIC), or the like.

(3) Terminal Device 300

The terminal device 300 can perform communication in a cellular system (or mobile communication system). The terminal device 300 performs radio communication with a base station (e.g., the base station 100) of the cellular system. For example, the terminal device 200 receives a downlink signal from the base station, and transmits an uplink signal to the base station.

In the embodiment of the present disclosure, in particular, the terminal device 300 does not support non-orthogonal multiple access (NOMA) as will be described below. For example, the terminal device 200 is not capable of performing interference cancellation (e.g., removing a signal destined for another terminal device by regarding it as an interfering signal). For this reason, the terminal device 300 can also be called a legacy terminal in the present specification.

(4) Frequency Band

The base station 100 performs radio communication with a terminal device using one or more frequency bands. For example, the base station 100 supports carrier aggregation (CA), and each of the one or more frequency bands is a component carrier (CC). Examples of frequency bands to be used by the base station 100 will be described below with reference to FIG. 5.

Figure 5:
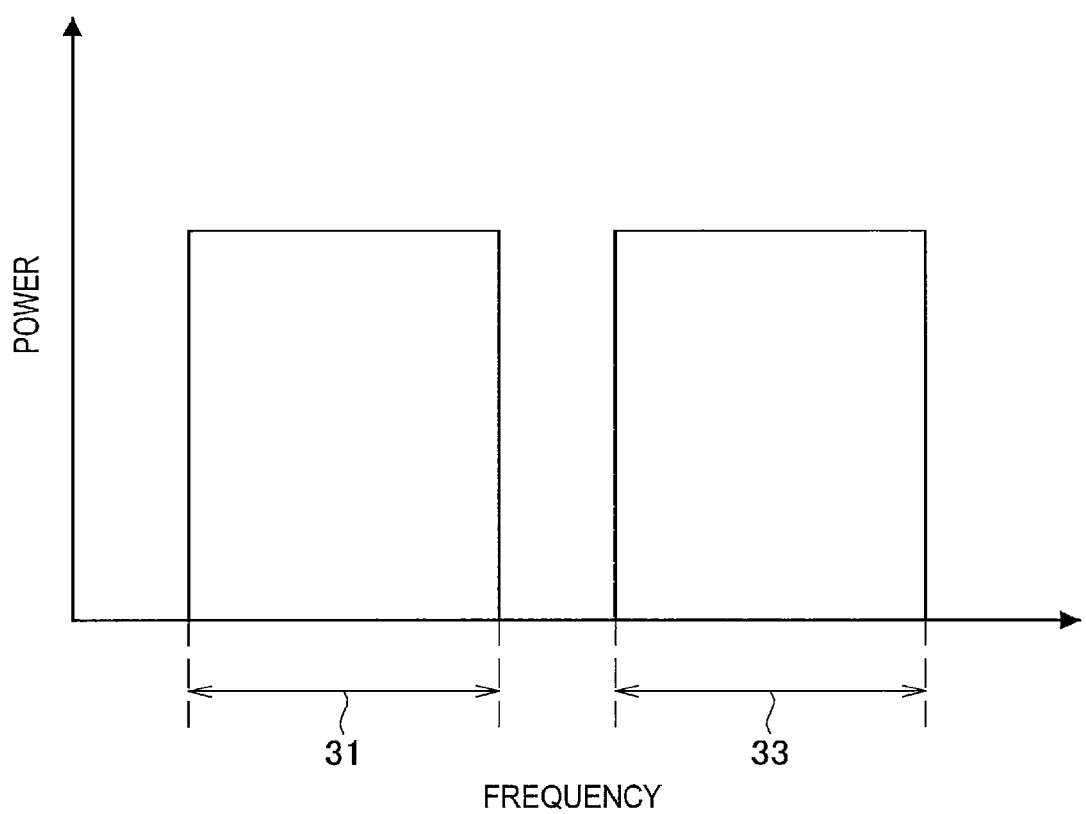
FIG. 5 is an illustrative diagram for describing examples of frequency bands to be used by a base station.

FIG. 5 is an illustrative diagram for describing examples of frequency bands to be used by the base station 100. Referring to FIG. 5, a CC 31 and a CC 33 are illustrated. The base station 100 performs radio communication with a terminal device using, for example, the CC 31 and the CC 33.

(5) Non-orthogonal Multiple Access (NOMA)

In the embodiment of the present disclosure, in particular, the base station 100 and the terminal device 200 support non-orthogonal multiple access (NOMA) as described above.

Radio communication of non-orthogonal multiple access is performed in downlink, for example. That is, the base station 100 transmits a signal using each of a plurality of layers that are to be multiplexed in a frequency band. The terminal device 200 decodes the signal transmitted on at least one of the plurality of layers that are to be multiplexed in the frequency band. Note that the terminal device 200 can remove a signal transmitted on another layer among the plurality of layers as interference in interference cancellation.

For example, non-orthogonal multiple access performed here is non-orthogonal multiple access using power allocation. More specifically, for example, the non-orthogonal multiple access is non-orthogonal multiple access using superposition coding (SPC) (i.e., SPC-NOMA). An example of this type of non-orthogonal multiple access will be described below using FIG. 6.

Figure 6:
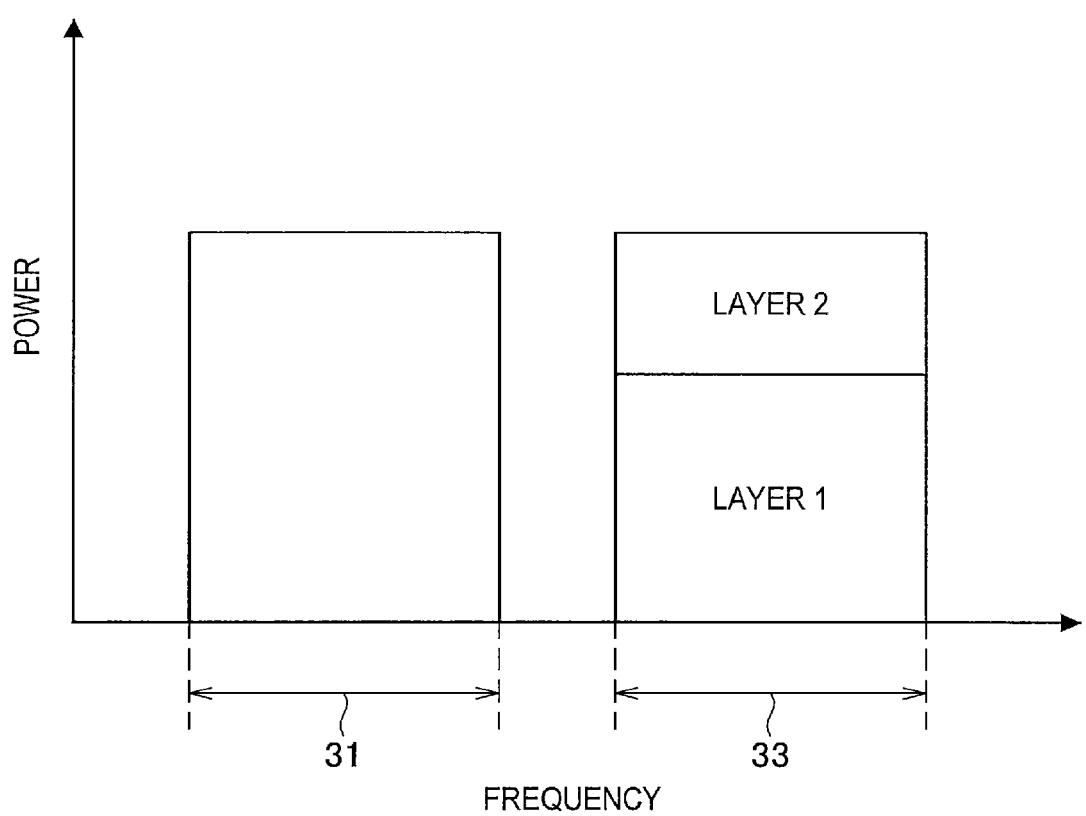
FIG. 6 is an illustrative diagram for describing an example of non-orthogonal multiple access.

FIG. 6 is an illustrative diagram for describing an example of the non-orthogonal multiple access. Referring to FIG. 6, the CC 31 and the CC 33 are illustrated as in FIG. 5. In this example, non-orthogonal multiple access using SPC is applied to the CC 33, and thus a layer 1 and a layer 2 are multiplexed in the CC 33. The base station 100 allocates a higher level of electric power to the layer 1 and a lower level of electric power to the layer 2. As an example, the base station 100 transmits a signal to the terminal device 200 using the layer 2 in the CC 33 and transmits a signal to another terminal device (e.g., another terminal device 200 or the terminal device 300) using the layer 1 in the CC 33. In this case, the terminal device 200 removes the signal transmitted on the layer 1 from the received signal as interference and decodes the signal transmitted on the layer 2.

Note that radio communication of the above-described non-orthogonal multiple access may be performed in uplink as well as in downlink.

<<3. Configuration of Each Device>>

Now, configurations of the base station 100 and the terminal device 200 according to an embodiment of the present disclosure will be described with reference to FIGS. 7 and 8.

<3.1. Configuration of Base Station>

First, an example of the configuration of the base station 100 according to an embodiment of the present disclosure will be described with reference to FIG. 7. FIG. 7 is a block diagram illustrating the example of the configuration of the base station 100 according to an embodiment of the present disclosure. According to FIG. 7, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal device, and receives an uplink signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes a selection unit 151, a notification unit 153, a transmission processing unit 155, and a reception processing unit 157. Note that the processing unit 150 can further include other constituent elements in addition to the above constituent elements. That is, the processing unit 150 can also perform operations other than the operations of the above constituent elements.

Operations of the selection unit 151, the notification unit 153, the transmission processing unit 155, and the reception processing unit 157 will be described below in detail.

<3.2. Configuration of Terminal Device>

First, an example of the configuration of the terminal device 200 according to an embodiment of the present disclosure will be described with reference to FIG. 8. FIG. 8 is a block diagram illustrating the example of the configuration of the terminal device 200 according to an embodiment of the present disclosure. According to FIG. 8, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal device 200.

(4) Processing Unit 240

The processing unit 240 provides various functions of the terminal device 200. The processing unit 240 includes an information acquisition unit 241, a notification unit 243, a transmission processing unit 245, and a reception processing unit 247. Note that the processing unit 240 can further include other constituent elements in addition to the above constituent elements. That is, the processing unit 240 can also perform operations other than the operations of the above constituent elements.

Operations of the information acquisition unit 241, the notification unit 243, the transmission processing unit 245, and the reception processing unit 247 will be described below in detail.

<<4. Technical Features>>

Next, technical features of the embodiment of the present disclosure will be described with reference to FIGS. 9 to 15.

(1) Selection and Notification of Frequency Band and Layer

The base station 100 (the selection unit 151) selects a frequency band to which non-orthogonal multiple access is applied and at least one layer among a plurality of layers that are to be multiplexed in the frequency band for the non-orthogonal multiple access as a band and a layer to be used for transmission to the terminal device 200. Then, the base station 100 (the notification unit 153) notifies the terminal device 200 of the frequency band and the at least one layer.

(a) Frequency Band

The base station 100 and the terminal device 200 support, for example, carrier aggregation (CA), and the frequency band is a component carrier (CC) for CA. Referring to FIG. 6 again, the frequency band is the CC 33 as an example.

(b) Non-orthogonal Multiple Access and Layer

The non-orthogonal multiple access is non-orthogonal multiple access using, for example, power allocation. In this case, the above-described plurality of layers are a plurality of layers that are to be multiplexed in the above-described frequency band using power allocation.

More specifically, for example, the non-orthogonal multiple access is non-orthogonal multiple access using SPC.

(c) Selection (c-1) One Layer

The at least one layer is, for example, one layer among the plurality of layers. That is, the base station 100 (the selection unit 151) selects the frequency band and one layer among the plurality of layers as a band and a layer to be used for transmission to the terminal device 200.

(c-2) Selection as SCC

The base station 100 (the selection unit 151) selects the frequency band as, for example, a secondary component carrier (SCC) to be used for transmission to the terminal device 200, and selects the at least one layer as a layer to be used for transmission to the terminal device 200 in the SCC. In other words, the base station 100 (the selection unit 151) selects a CC to be added as an SCC and a layer to be used for transmission in the SCC when the SCC for the terminal device 200 is added.

Note that the frequency band may be a CC dedicated as an SCC (i.e., a CC used only as an SCC, not used as a primary component carrier (PCC)).

(c-3) Selection as Band of Handover Destination

The base station 100 (the selection unit 151) may select the frequency band as a band of a handover destination of the terminal device 200, and select the at least one layer as a layer to be used for transmission to the terminal device 200 in the band of the handover destination. In other words, the base station 100 (the selection unit 151) may select a CC of a handover destination that is a PCC and a layer to be used for transmission in the PCC at the time of handover of the terminal device 200.

(c-4) Example of Selection

Referring to FIG. 6 again, the base station 100 (the selection unit 151) selects the CC 33 and the layer 2 as a band and a layer to be used for transmission to the terminal device 200 as an example. The base station 100 (the selection unit 151) selects the CC 33 and the layer 1 as a band and a layer to be used for transmission to the terminal device 200 as another example.

(d) Notification (d-1) First Example

The base station 100 (the notification unit 153) notifies the terminal device 200 of the frequency band and the at least one layer through, for example, signaling (e.g., radio resource control (RRC) signaling) to the terminal device 200. That is, the base station 100 (the notification unit 153) notifies the terminal device 200 of the frequency band and the at least one layer included in a signaling message (e.g., an RRC message) thereto. As an example, the signaling message is an RRC connection reconfiguration message.

As a specific process, for example, the notification unit 153 generates a signaling message that includes band information (information indicating the frequency band) and layer information (information indicating the at least one layer). Then, the transmission processing unit 155 performs a transmission process of the signaling message.

(d-2) Second Example

When the frequency band is selected as an SCC, the base station 100 (the notification unit 153) may notify the terminal device 200 of the frequency band and the at least one layer included in a media access control (MAC) control element. The MAC control element may be for activation of the SCC.

As a specific process, the notification unit 153 may generate an MAC control element that includes band information (information indicating the frequency band) and layer information (information indicating the at least one layer). Then, the transmission processing unit 155 may perform a transmission process of the MAC control element.

(d-3) Operation of Terminal Device

The terminal device 200 (the information acquisition unit 241) acquires the band information (the information indicating the frequency band) and the layer information (the information indicating the at least one layer).

The terminal device 200 receives, for example, the signaling message including the band information and the layer information (or the MAC control element). Thereby, the terminal device 200 (the information acquisition unit 241) acquires the band information and the layer information.

(e) Others

The terminal device 200 (the notification unit 243) notifies the base station 100 of, for example, capability information indicating that the terminal device 200 supports the non-orthogonal multiple access. Specifically, for example, the terminal device 200 (the notification unit 243) notifies the base station 100 of the capability information included in a signaling message (e.g., an RRC message). As an example, the signaling message is a UE capability information message.

As a specific process, for example, the notification unit 243 generates the signaling message. Then, the transmission processing unit 155 performs a transmission process of the signaling message.

Accordingly, for example, the base station 100 can ascertain the terminal device supporting the non-orthogonal multiple access.

As described above, the base station 100 selects the frequency band and the at least one layer as a band and a layer to be used for transmission to the terminal device 200, and notifies the terminal device 200 of the frequency band and the at least one layer. Accordingly, for example, it is possible to further reduce a burden of scheduling in non-orthogonal multiple access. More specifically, for example, a layer to be used by the terminal device 200 is not selected each time a signal is transmitted to the terminal device 200 (i.e., each time scheduling is performed), but is selected when a frequency band starts being used, and thus a burden of processing performed by the base station 100 can be reduced. In addition, the terminal device 200 is not notified of a layer to be used by the terminal device 200 each time a signal is transmitted to the terminal device 200 (i.e., each time scheduling is preformed), but may be notified thereof when a frequency band starts being used, and thus a burden of consuming radio resources can be reduced.

(2) Case of Legacy Terminal (Terminal Device 300)

The base station 100 (the selection unit 151) selects, for example, the frequency band and a layer among the plurality of layers to which maximum power is allocated as a band and a layer to be used for transmission to the terminal device 300 (i.e., a terminal device not supporting the non-orthogonal multiple access). Then, the base station 100 (the notification unit 153) notifies the terminal device 300 of the frequency band.

(a) Selection (a-1) Selection of SCC

The base station 100 (the selection unit 151) selects, for example, the frequency band as an SCC to be used for transmission to the terminal device 300, and selects the layer to which maximum power is allocated as a layer to be used for transmission to the terminal device 300 in the SCC. In other words, the base station 100 (the selection unit 151) selects a CC to be added as an SCC and a layer to be used for transmission (a layer to which maximum power is allocated) in the SCC when the SCC for the terminal device 300 is added.

(a-2) Selection of Band of Handover Destination

The base station 100 (the selection unit 151) may select the frequency band as a band of a handover destination of the terminal device 300 and select the layer to which the maximum power is allocated as a layer to be used for transmission to the terminal device 300 in the band of the handover destination. In other words, the base station 100 (the selection unit 151) may select a CC of a handover destination as a prima component carrier (PCC) and a layer (a layer to which maximum power is allocated) to be used for transmission in the PCC at the time of handover of the terminal device 300.

(a-3) Example of Selection

Referring to FIG. 6 again, the base station 100 (the selection unit 151) selects the CC 33 and the layer 1 as a band and a layer to be used for transmission to the terminal device 300 as an example.

(b) Notification

The base station 100 (the notification unit 153) notifies the terminal device 300 of the frequency band as described above. Note that the base station 100 (the notification unit 153) does not notify the terminal device 300 of the layer to which the maximum power is allocated. The reason for this is that it is neither possible nor necessary for the terminal device 300, which is a legacy terminal, to ascertain the layer.

(b-1) First Example

For example, the base station 100 (the notification unit 153) notifies the terminal device 300 of the frequency band through signaling (e.g., RRC signaling) to the terminal device 300. That is, the base station 100 (the notification unit 153) notifies the terminal device 300 of the frequency band included in a signaling message (e.g., an RRC message) thereto. As an example, the signaling message is an RRC connection reconfiguration message.

As a specific process, for example, the notification unit 153 generates a signaling message that includes band information (information indicating the frequency band). Then, the transmission processing unit 155 performs a transmission process of the signaling message.

(b-2) Second Example

When the frequency band is selected as an SCC, the base station 100 (the notification unit 153) may notify the terminal device 300 of the frequency band included in an MAC control element. The MAC control element may be for activation of the SCC.

As a specific process, the notification unit 153 may generate the MAC control element that includes band information (information indicating the frequency band). Then, the transmission processing unit 155 may perform a transmission process of the MAC control element.

(b-3) Operation of Terminal Device

The terminal device 300 acquires, for example, the band information (the information indicating the frequency band).

The terminal device 300 receives, for example, the signaling message (or the MAC control element) that includes the band information. Thereby, the terminal device 300 acquires the band information.

The base station 100 (the selection unit 151) selects, for example, the frequency band and the layer to which the maximum power is allocated as a band and a layer to be used for transmission to the terminal device 300, and notifies the terminal device 300 of the frequency band as described above. Accordingly, backward compatibility, for example, can be secured. That is, a legacy terminal (the terminal device 300) can perform radio communication even in a frequency band to which non-orthogonal multiple access is applied. More specifically, even when a signal of another layer (i.e., an interfering signal) is included in a received signal, for example, the legacy terminal (the terminal device 300) can decode a signal destined for itself (e.g., without performing interference cancellation) because a higher level of electric power is allocated to the signal to the legacy terminal.

Note that the base station 100 (the selection unit 151) may of course select the frequency band and the layer to which the maximum power is allocated as a band and a layer to be used for transmission to the terminal device 200 (or another the terminal device 200 (which is not illustrated)), rather than the terminal device 300.

(3) Transmission and Reception on Layer (a) Transmission by Base Station 100

The base station 100 (the transmission processing unit 155) transmits a signal in the frequency band. More specifically, the base station 100 (the transmission processing unit 155) transmits a signal using each of a plurality of layers in the frequency band.

In particular, the base station 100 (the transmission processing unit 155) transmits the signal to the terminal device 200 using the at least one layer (a layer to be used for transmission to the terminal device 200) in the frequency band.

The base station 100 (the transmission processing unit 155) transmits a signal to the terminal device 300 using, for example, the layer to which the maximum power is allocated in the frequency band.

Referring to FIG. 6 again, the base station 100 transmits a signal to the terminal device 200 using the layer 2 and transmits a signal to the terminal device 300 using the layer 1 in the CC 33, as an example.

Note that, in the present specification, "the transmission processing unit 155 transmits a signal to a terminal device" means "the transmission processing unit 155 perform is a transmission process of transmitting a signal to a terminal device." The transmission process mentioned here includes, for example, digital processing of a physical layer.

(b) Reception by Terminal Device 200

The terminal device 200 (the information acquisition unit 241) acquires the band information (the information indicating the frequency band) and the layer information (the information indicating the at least one layer) as described above. Then, the terminal device 200 (the reception processing unit 247) decodes the signal transmitted on the at least one layer (i.e., a layer to be used for transmission to the terminal device 200) in the frequency band.

The at least one layer (i.e., a layer to be used for transmission to the terminal device 200) is, for example, one layer among the plurality of layers.

In a first case, for example, the one layer is a layer to which maximum power is allocated among the plurality of layers. In this case, the terminal device 200 decodes a signal transmitted on the one layer from, for example, a received signal (i.e., a multiplexed signal).

In a second case, for example, the one layer is a layer different from the layer to which the maximum power is allocated among the plurality of layers. In this case, for example, the terminal device 200 generates a signal transmitted on another layer (e.g., a layer to which a higher level of electric power is allocated than the one layer) as an interference replica signal and removes the interference replica signal from a received signal. Then, the terminal device 200 decodes a signal of the received signal transmitted on the one layer after the removal.

Referring to FIG. 6 again, the base station 100 transmits a signal to the terminal device 200 using the layer 2 in the CC 33, as an example. In this case, the terminal device 200 generates a signal transmitted on the layer 1 in the CC 33 as an interference replica signal, and removes the interference replica signal from a received signal of the CC 33. Then, the terminal device 200 decodes the signal transmitted on the layer 2 in the CC 33 from the received signal after the removal.

(c) Reception by Legacy Terminal (Terminal Device 300)

The terminal device 300 acquires the band information (the information indicating the frequency band) as described above. Then, the terminal device 300 decodes a signal transmitted in the frequency band (practically, a signal transmitted on the layer to which maximum power is allocated). Note that the terminal device 200 is a legacy terminal (a terminal device that does not support the non-orthogonal multiple access) and decodes a signal regardless of a layer.

(d) Signal Transmitted on Each Layer (d-1) Signal of Physical Data Channel

The base station 100 (the transmission processing unit 155) transmits, for example, a signal of a physical data channel on each of the plurality of layers in the frequency band.

The physical data channel is a channel used for transmission of a data signal (and a control signal). For this reason, the signal of the physical data channel is a data signal (and a control signal).

As an example, the physical data channel is a physical downlink shared channel (PDSCH). However, the physical data channel is not limited thereto, and may have another name in a future standard.

Thereby, for example, the data signal is multiplexed and thus the base station 100 can transmit more data signals.

(d-2) Signal of Physical Control Channel

The base station 100 (the transmission processing unit 155) transmits, for example, a signal of a physical control channel in the frequency band.

The physical control channel is a channel used for transmission of a control signal. For this reason, the signal of the physical data channel is a control signal. More specifically, the control signal is, for example, a signal of downlink control information (DCI).

As an example, the physical control channel is a physical downlink control channel (PDCCH). However, the physical control channel is not limited thereto, and may have another name in a future standard.

Transmission on One Layer

The base station 100 (the transmission processing unit 155) transmits, for example, the signal of the physical control channel using one layer among the plurality of layers in the frequency band.

The signal of the physical control channel includes, for example, a signal of scheduling information with respect to each of the plurality of layers. This can also be called cross-layer scheduling. In addition, the one layer among the plurality of layers is, for example, a layer to which maximum transmission power among the plurality of layers is allocated. Examples of signals transmitted on layers by the base station 100 will be described below with reference to FIGS. 9 and 10.

Figure 9:
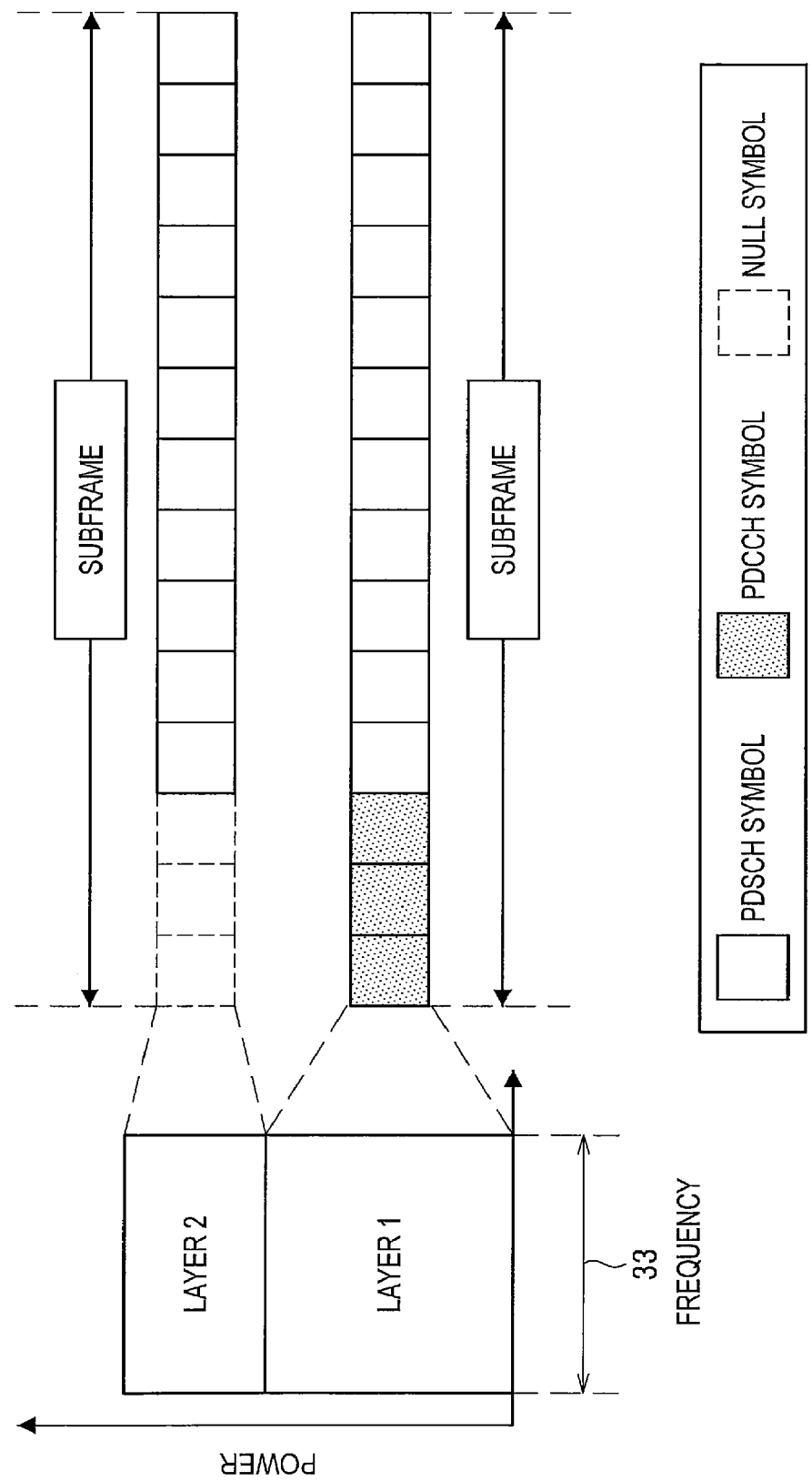
FIG. 9 is an illustrative diagram for describing a first example of a signal transmitted on each layer by a base station.

FIG. 9 is an illustrative diagram for describing a first example of a signal transmitted on each layer by the base station 100. Referring to FIG. 9, the layer 1 and the layer 2 of the CC 33 are illustrated. In this example, a first to a third symbols among subframes are symbols in which a PDCCH is deployed in the layer 1, and null symbols in the layer 2. That is, the base station 100 transmits a signal of the PDCCH on the layer 1 and transmits no signal on the layer 2 in the first to the third symbols. Accordingly, communication quality of the layer 1 can be enhanced. In particular, the signal of the PDCCH transmitted on the layer 1 includes signals of scheduling information for the layer 1 and the layer 2. In addition, a $4^{th}$ to a $14^{th}$ symbols among the subframes of the layer 1 and the layer 2 are symbols in which a PDSCH is deployed in the layer 1 and the layer 2. That is, the base station 100 transmits a signal of the PDSCH on the layer 1 and the layer 2 in the $4^{th}$ to the $14^{th}$ symbols.

Figure 10:
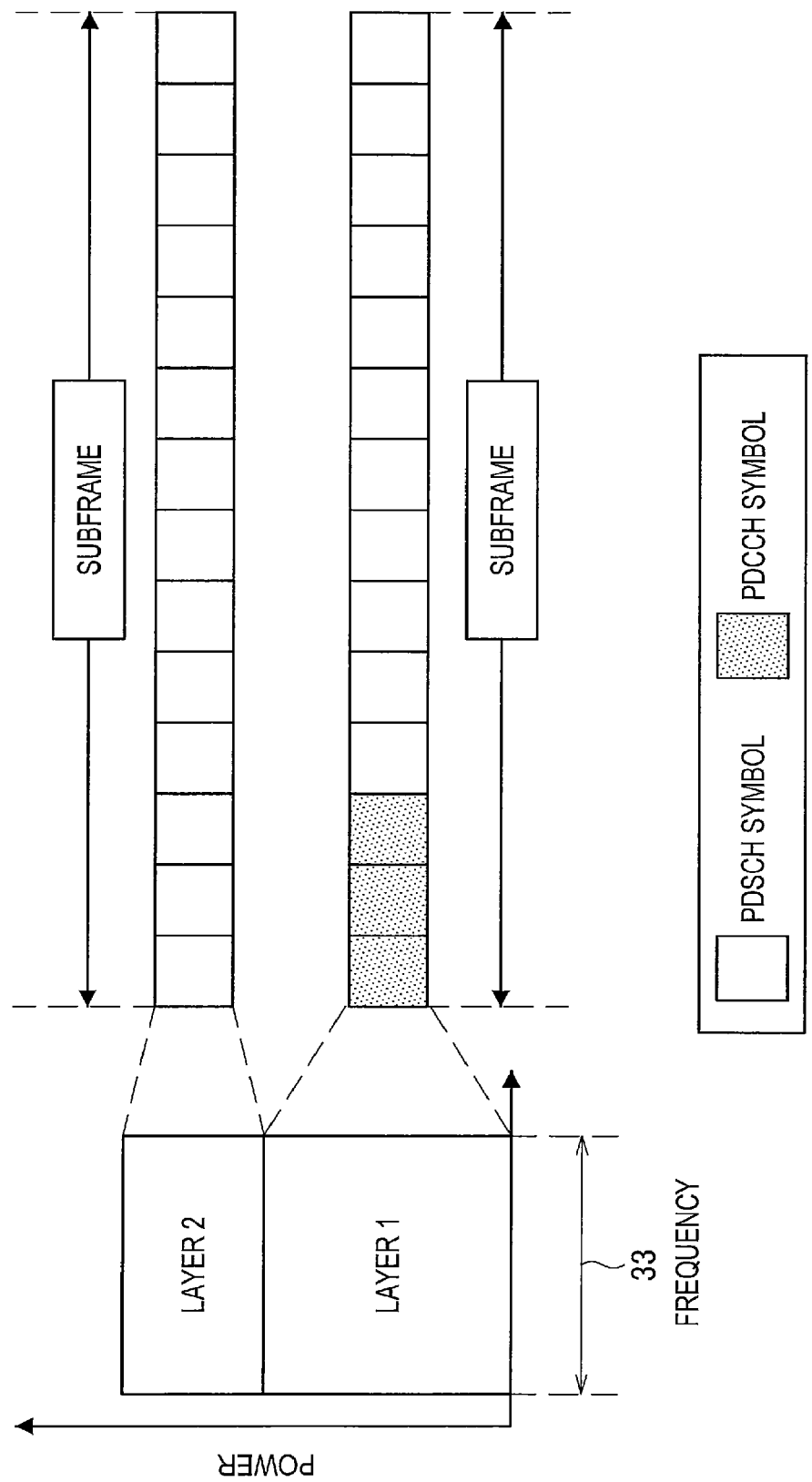
FIG. 10 is an illustrative diagram for describing a second example of a signal transmitted on each layer by a base station.

FIG. 10 is an illustrative diagram for describing a second example of a signal transmitted on each layer by the base station 100. Referring to FIG. 10, the layer 1 and the layer 2 of the CC 33 are illustrated. Particularly in this example, the first to the third symbols among subframes are not null symbols in the layer 2 but symbols in which a PDSCH is deployed. That is, the base station 100 transmits a signal of the PDCCH on the layer 1 and transmits a signal of the PDSCH on the layer 2 in the first to the third symbols. Accordingly, the base station 100 can transmit more data signals.

Note that the base station 100 (the transmission processing unit 155) may transmit a signal of the physical control channel without multiplexing in the frequency band, instead of transmitting the signal of the physical control channel on the one layer in the frequency band.

According to the first example described above, the terminal device 200 can acquire the scheduling information more easily. More specifically, for example, the terminal device 200 can acquire the scheduling information without interference cancellation, regardless of a layer to be used for transmission to the terminal device 200.

Transmission on Each Layer

The base station 100 (the transmission processing unit 155) may transmit a signal of the physical control channel on each of the plurality of layers in the frequency band. An example of a signal transmitted on each layer by the base station 100 will be described below with reference to FIG. 11.

Figure 11:
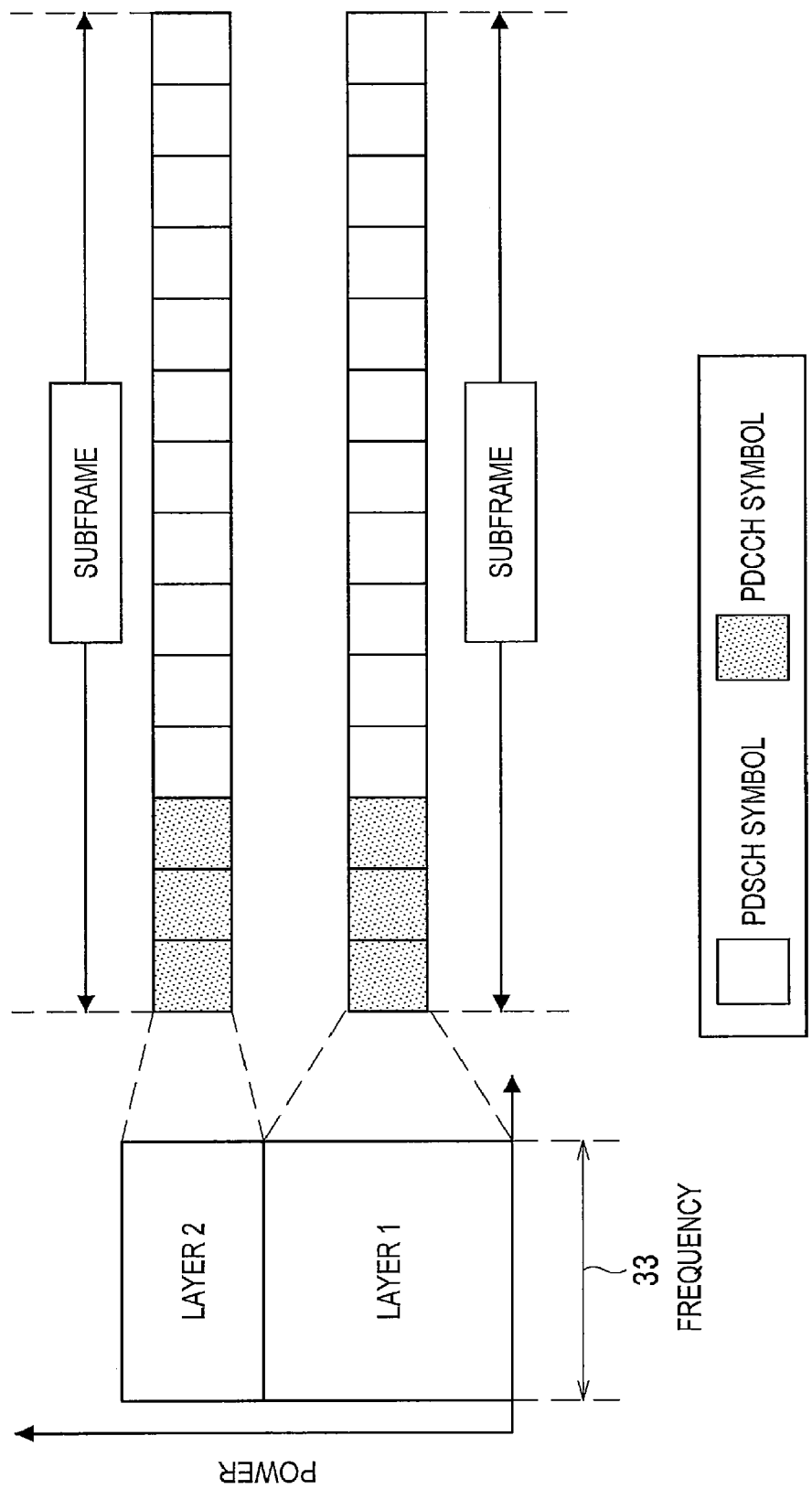
FIG. 11 is an illustrative diagram for describing a third example of a signal transmitted on each layer by a base station.

FIG. 11 is an illustrative diagram for describing a third example of a signal transmitted on each layer by the base station 100. Referring to FIG. 11, the layer 1 and the layer 2 of the CC 33 are illustrated. In this example, the first to the third symbols among subframes are symbols in which a PDCCH is deployed in the layer 1 and the layer 2. That is, the base station 100 transmits signals of the PDCCH on the layer 1 and the layer 2 in the first to the third symbols. The signal of the PDCCH transmitted on the layer 1 includes a signal of scheduling information of the layer 1, and the signal of the PDCCH transmitted on the layer 2 includes a signal of scheduling information of the layer 2. In addition, the $4^{th}$ to a $14^{th}$ symbols among the subframes are symbols in which a PDSCH is deployed in the layer 1 and the layer 2. That is, the base station 100 transmits signals of the PDSCH on the layer 1 and the layer 2 in the $4^{th}$ to a $14^{th}$ symbols.

According to the second example described above, the scheduling information can be more simplified.

Cross-carrier Scheduling

The base station 100 (the transmission processing unit 155) may not transmit the signal of the physical control channel in the frequency band. Instead, the base station 100 (the transmission processing unit 155) may transmit the signal of the physical control channel in another frequency band and the signal may include the signal of the scheduling information for each of the plurality of layers. That is, cross-carrier scheduling may be performed. An example of a signal transmitted on each layer by the base station 100 will be described below with reference to FIG. 12.

Figure 12:
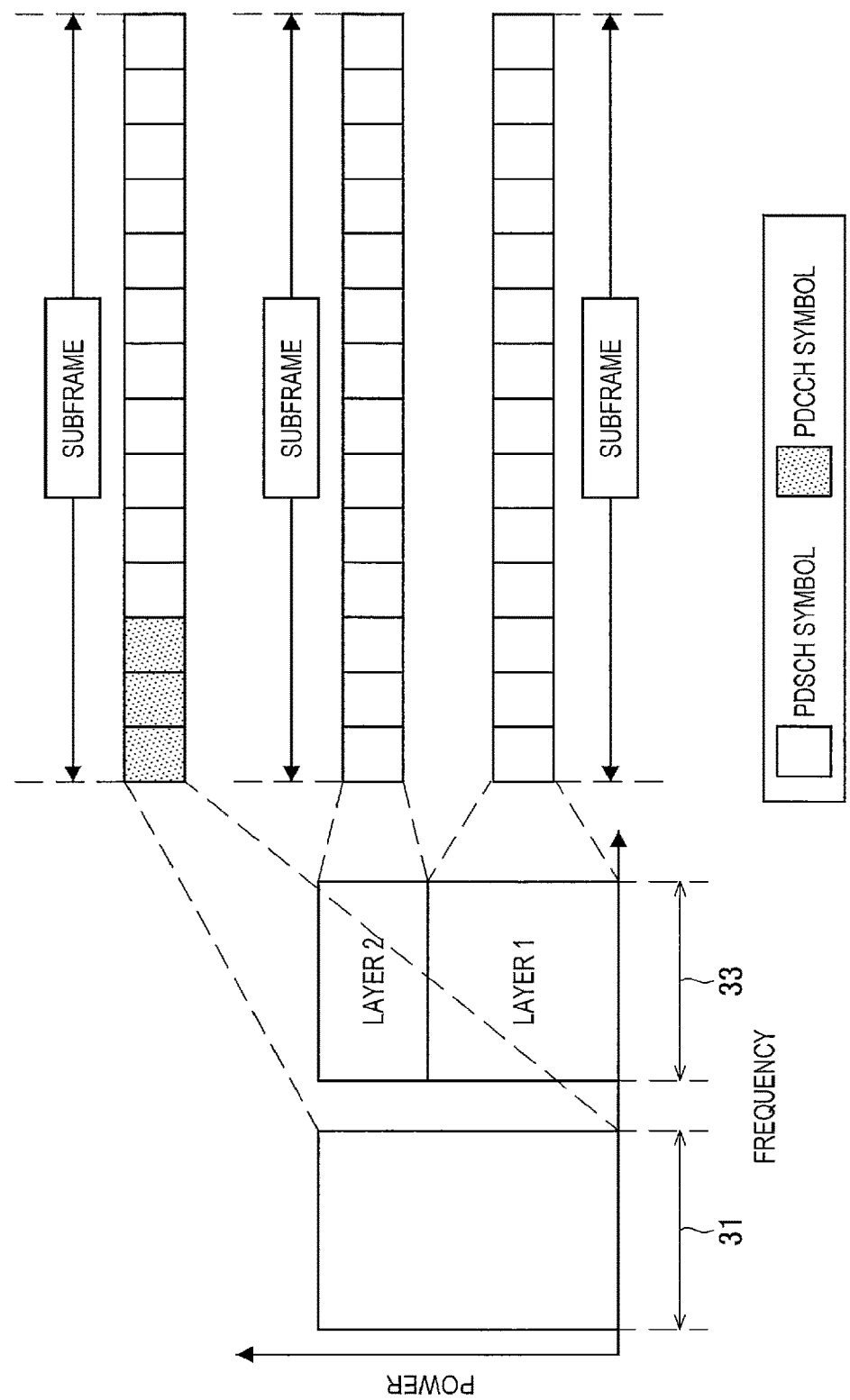
FIG. 12 is an illustrative diagram for describing a fourth example of a signal transmitted on each layer by a base station.

FIG. 12 is an illustrative diagram for describing a fourth example of a signal transmitted on each layer by the base station 100. Referring to FIG. 12, the CC 31 and the CC 33 are illustrated, and the layer 1 and the layer 2 of the CC 33 are also illustrated. In this example, a PDCCH is deployed in neither the layer 1 nor the layer 2 in the CC 33. Instead, a PDCCH is deployed in the CC 31, and scheduling information of the layer 1 and the layer 2 of the CC 33 is transmitted in the PDCCH. That is, the base station 100 transmits a signal of the PDCCH in the first to the third symbols of the CC 31, and the signal includes the signal of the scheduling information of the layer 1 and the layer 2 of the CC 33. Note that all symbols of the subframes in the CC 33 are symbols in which the PDSCH is deployed in the layer 1 and the layer 2. That is, the base station 100 transmits the signal of the PDSCH on the layer 1 and the layer 2 in all the symbols.

(d-3) Other Signals

Further, the base station 100 transmits, for example, other signals in the frequency band as well.

Other Signals

The other signals include, for example, a synchronization signal. For example, the synchronization signal includes a primary synchronization signal (PSS) and a secondary synchronization signal (SSS).

The other signals include, for example, a signal of a physical broadcast channel (PBCH).

FIRST EXAMPLE

As a first example, the base station 100 (the transmission processing unit 155) transmits the other signals on one layer among the plurality of layers in the frequency band. Examples of signals transmitted on each layer by the base station 100 will be described below with reference to FIGS. 13 and 14.

Figure 13:
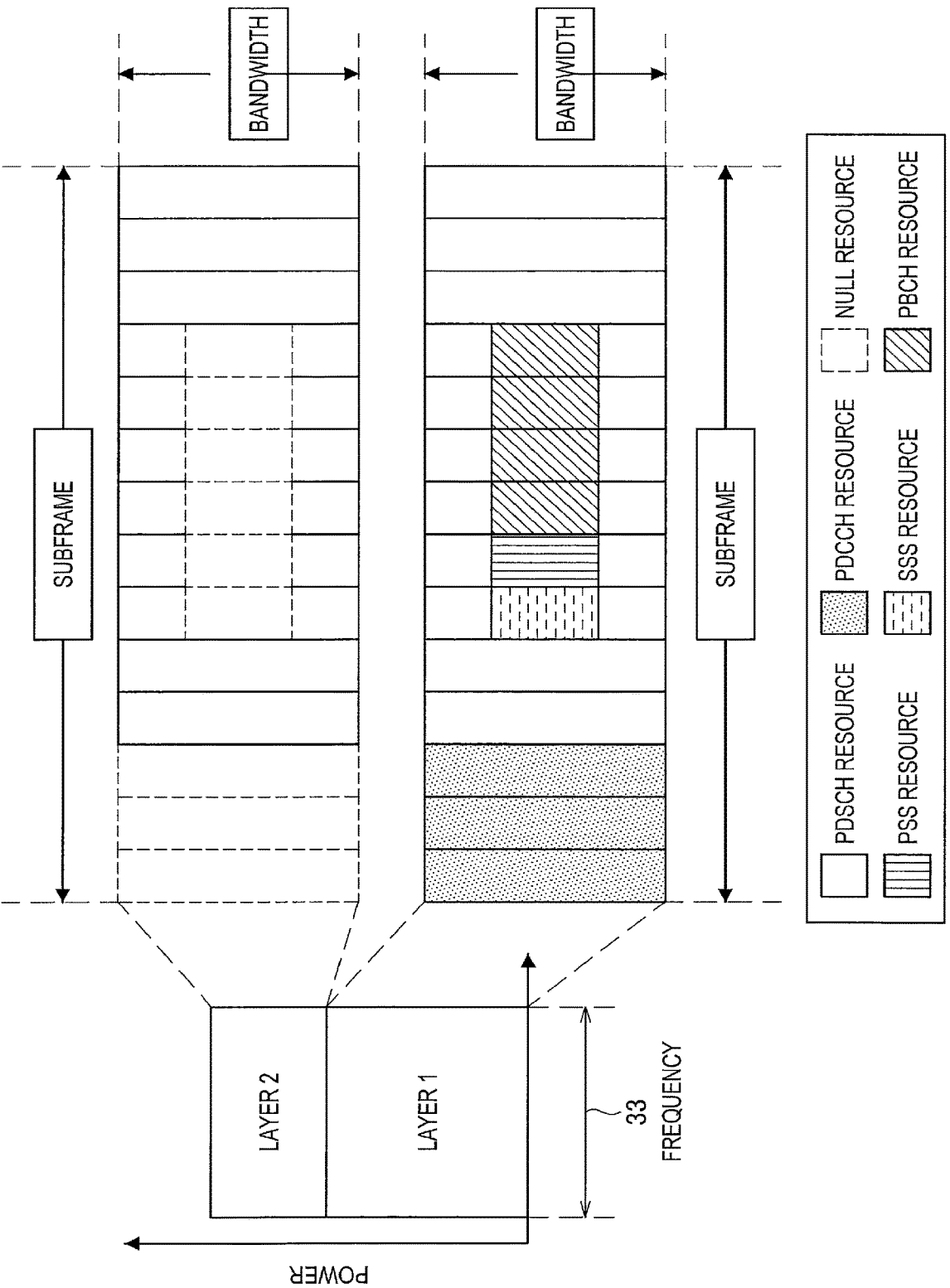
FIG. 13 is an illustrative diagram for describing a fifth example of a signal transmitted on each layer by a base station.

FIG. 13 is an illustrative diagram for describing a fifth example of a signal transmitted on each layer by the base station 100. Referring to FIG. 13, the layer 1 and the layer 2 of the CC 33 are illustrated. In this example, the base station 100 transmits signals of a PSS, a SSS, and a PBCH on the layer 1 in the CC 33. On the other hand, the base station 100 transmits none of the signals of the PSS, the SSS, and the PBCH on the layer 2 in the CC 33. Particularly in this example, the base station 100 transmits no signal on the layer 2 using radio resources for the PSS and SSS and the PBCH. Accordingly, communication quality of the layer 1 can be enhanced. More specifically, for example, quality of the PSS, the SSS, and the PBCH can be enhanced.

Figure 14:
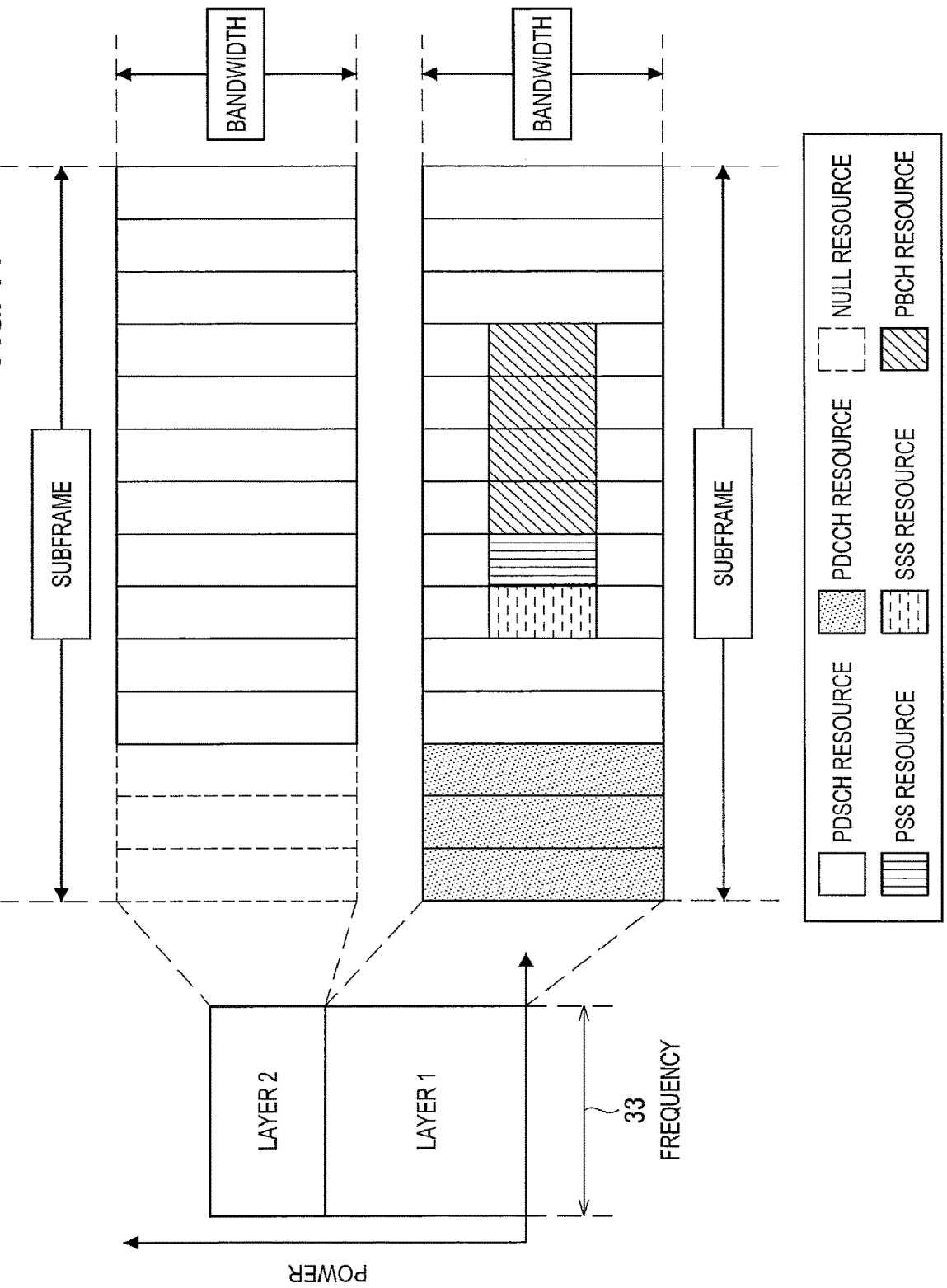
FIG. 14 is an illustrative diagram for describing a sixth example of a signal transmitted on each layer by a base station.

FIG. 14 is an illustrative diagram for describing a sixth example of a signal transmitted on each layer by the base station 100. Referring to FIG. 14, the layer 1 and the layer 2 of the CC 33 are illustrated. Particularly in this example, the base station 100 transmits a signal of a PDSCH on the layer 2 using radio resources for the PSS, the SSS, and the PBCH. Accordingly, the base station 100 can transmit more data signals.

Note that the base station 100 (the transmission processing unit 155) may transmit the other signals without multiplexing in the frequency band, instead of transmitting the other signals on the one layer in the frequency band.

SECOND EXAMPLE

As a second example, the base station 100 (the transmission processing unit 155) may transmit the other signals (e.g., a synchronization signal and/or a signal of a PBCH) on each of the plurality of layers in the frequency band. Accordingly, for example, each layer can be treated as an independent CC.

(e) Others (e-1) Bandwidth of Each Layer

Bandwidths of frequency resources to be used may be different between at least two layers included in the plurality of layers. A specific example thereof will be described with reference to FIG. 15 below.

Figure 15:
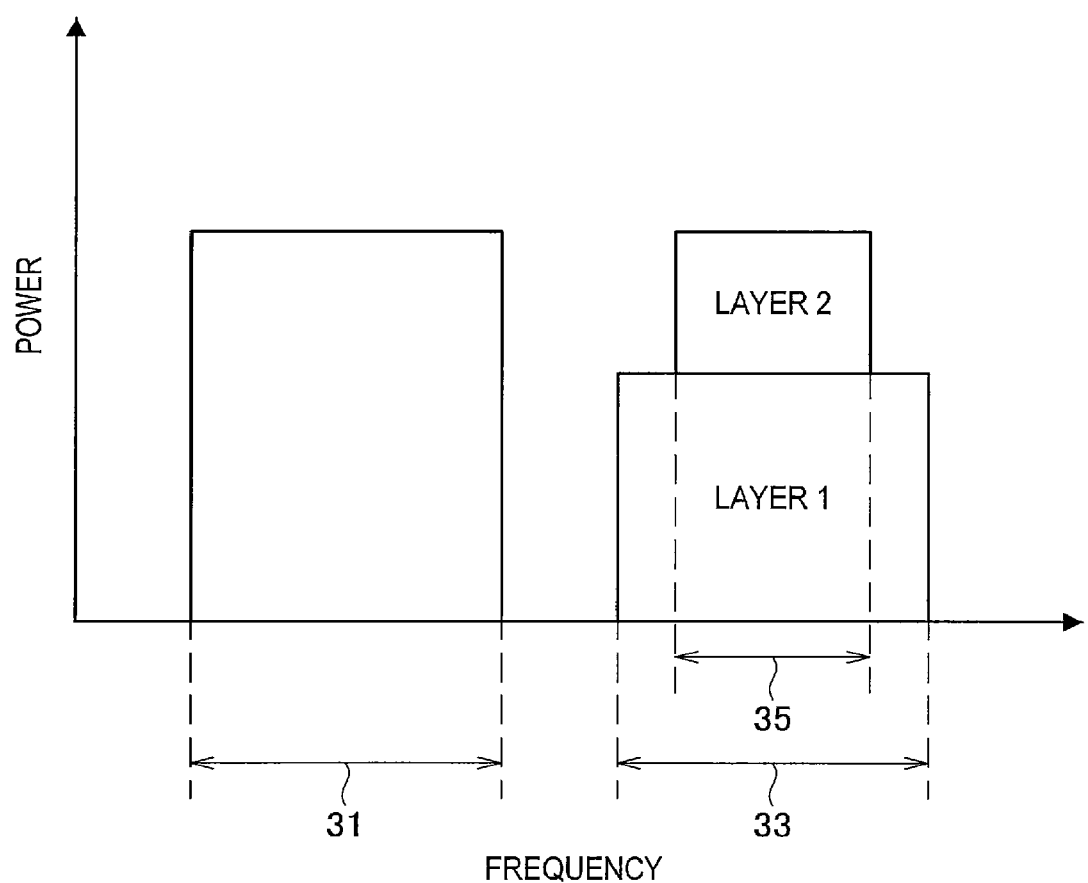
FIG. 15 is an illustrative diagram for describing examples of bandwidths of respective layers.

FIG. 15 is an illustrative diagram for describing examples of bandwidths of respective layers. Referring to FIG. 15, the CC 31 and the CC 33 are illustrated. For example, the entire CC 33 is used for the layer 1 of the CC 33 and a partial band 35 which is a part of the CC 33 is used for the layer 2 of the CC 33.

(e-2) Treatment of Layer

Each of the plurality of layers may be treated like a component carrier. For example, system information may be transmitted on each of the plurality of layers. In addition for example, each of the plurality of layers may be activated or deactivated for the terminal device 200.

(4) Re-selection and Notification of Layer

The base station 100 (the selection unit 151) re-selects, for example, another layer among the plurality of layers as a layer to be used for transmission to the terminal device 200. Then, the base station 100 (the notification unit 153) notifies the terminal device 200 of the other layer. That is, the base station 100 changes only the layer without changing the frequency band (e.g., a CC), and notifies the terminal device 200 of the changed layer. The re-selection of the layer (the change of the layer) can also be called handover of layers.

Referring to FIG. 6 again, the terminal device 200 uses the layer 2 of the CC 33 as an example. In this case, the base station 100 re-selects the layer 1 of the CC 33 as a layer to be used for transmission to the terminal device 200. Then, the base station 100 notifies the terminal device 200 of the layer 1.

The base station 100 re-selects, for example, another layer on the basis of a result of measurement by the terminal device 200. More specifically, for example, when communication quality of the terminal device 200 deteriorates, the base station 100 re-selects a layer to which a higher level of electric power is allocated (e.g., the layer 1 of the CC3 illustrated in FIG. 6) as a layer to be used for transmission to the terminal device 200. On the other hand, for example, when communication quality of the terminal device 200 is improved, the base station 100 re-selects a layer to which a lower level of electric power is allocated (e.g., the layer 2 of the CC3 illustrated in FIG. 6) as a layer to be used for transmission to the terminal device 200.

Accordingly, for example, it is possible for the terminal device 200 to flexibly use layers.

<<5. Process Flow>>

Next, technical features of the embodiment of the present disclosure will be described with reference to FIGS. 16 and 17.

(1) Overall Process

Figure 16:
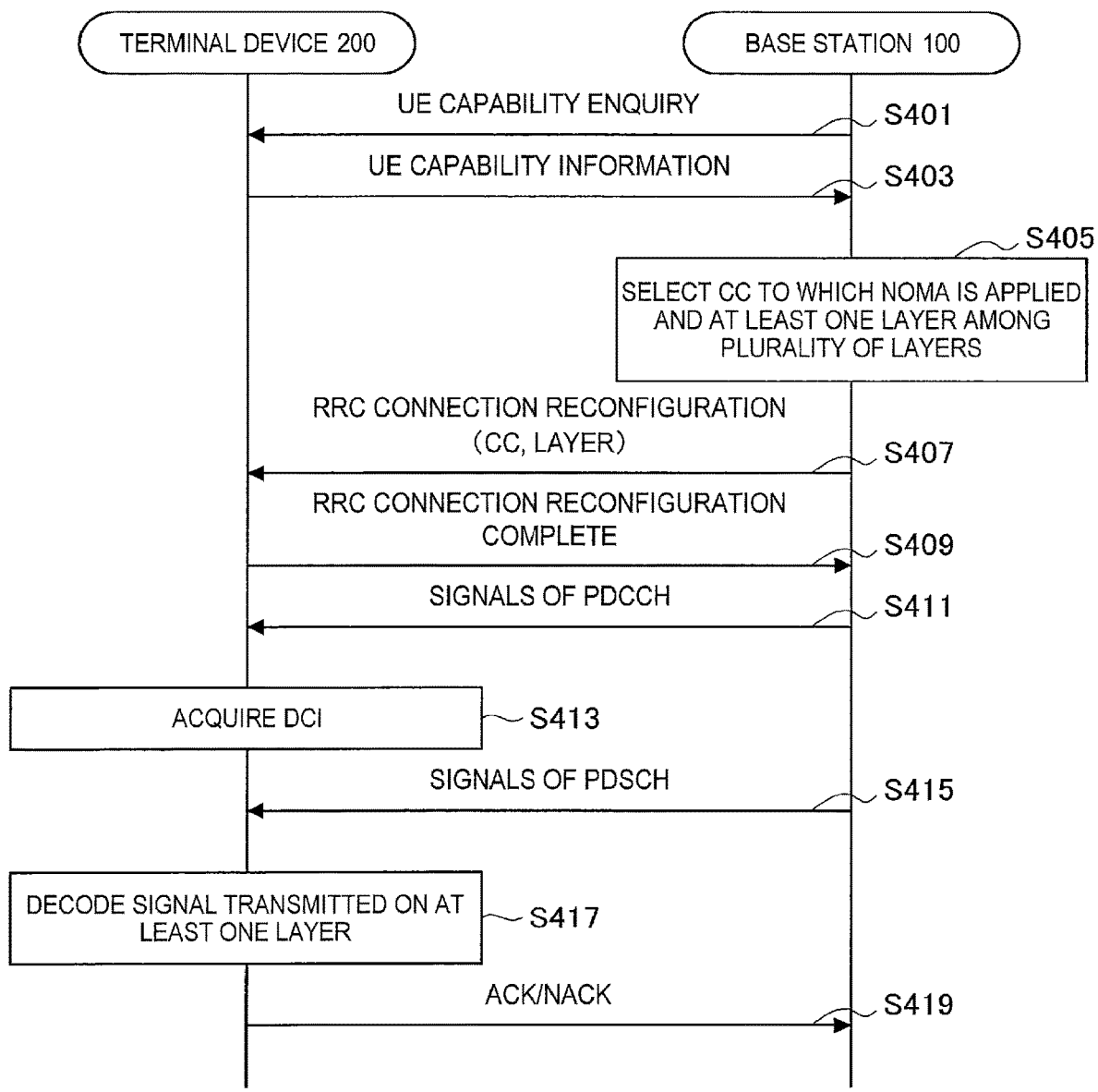
FIG. 16 is a sequence diagram illustrating an example of a schematic flow of an overall process according to the embodiment.

FIG. 16 is a sequence diagram illustrating an example of a schematic flow of an overall process according to the embodiment of the present disclosure.

The base station 100 transmits a UE capability enquiry message to the terminal device 200 (S401).

The terminal device 200 transmits a UE capability information message (S403). The UE capability information message includes capability information indicating that the terminal device 200 supports non-orthogonal multiple access (NOMA). The terminal device 200 notifies the base station 100 of the capability information in this manner, for example.

The base station 100 selects a CC to which the non-orthogonal multiple access is applied and at least one layer among a plurality of layers that are to be multiplexed in the CC for the non-orthogonal multiple access as a band and a layer to be used for transmission to the terminal device 200 (S405).

The base station 100 transmits an RRC connection reconfiguration message to the terminal device 200 (S407). The RRC connection reconfiguration message includes band information indicating the CC and layer information indicating the at least one layer. The base station 100 notifies the terminal device 200 of the CC and the at least one layer in this manner, for example.

The terminal device 200 acquires the band information and the layer information, and transmits an RRC connection reconfiguration complete message to the base station 100 (S409).

The base station 100 transmits a signal of a PDCCH in the CC (S411). For example, the base station 100 transmits the signal of the PDCCH on one layer among the plurality of layers in the CC.

The terminal device 200 acquires downlink control information (DCI) by decoding the signal of the PDCCH (S413). The downlink control information includes scheduling information. The scheduling information is scheduling information of the at least one layer of the CC.

The base station 100 transmits a signal of a PDSCH on each of the plurality of layers in the CC (S415). For example, the base station 100 transmits the signal to the terminal device 200 on the at least one layer in the CC.

The terminal device 200 decodes the signal transmitted on the at least one layer in the CC (S417). Then, the terminal device 200 transmits an acknowledgement (ACK)/a negative acknowledgement (NACK) to the base station 100 (S419).

(2) Process of Terminal Device 200

Figure 17:
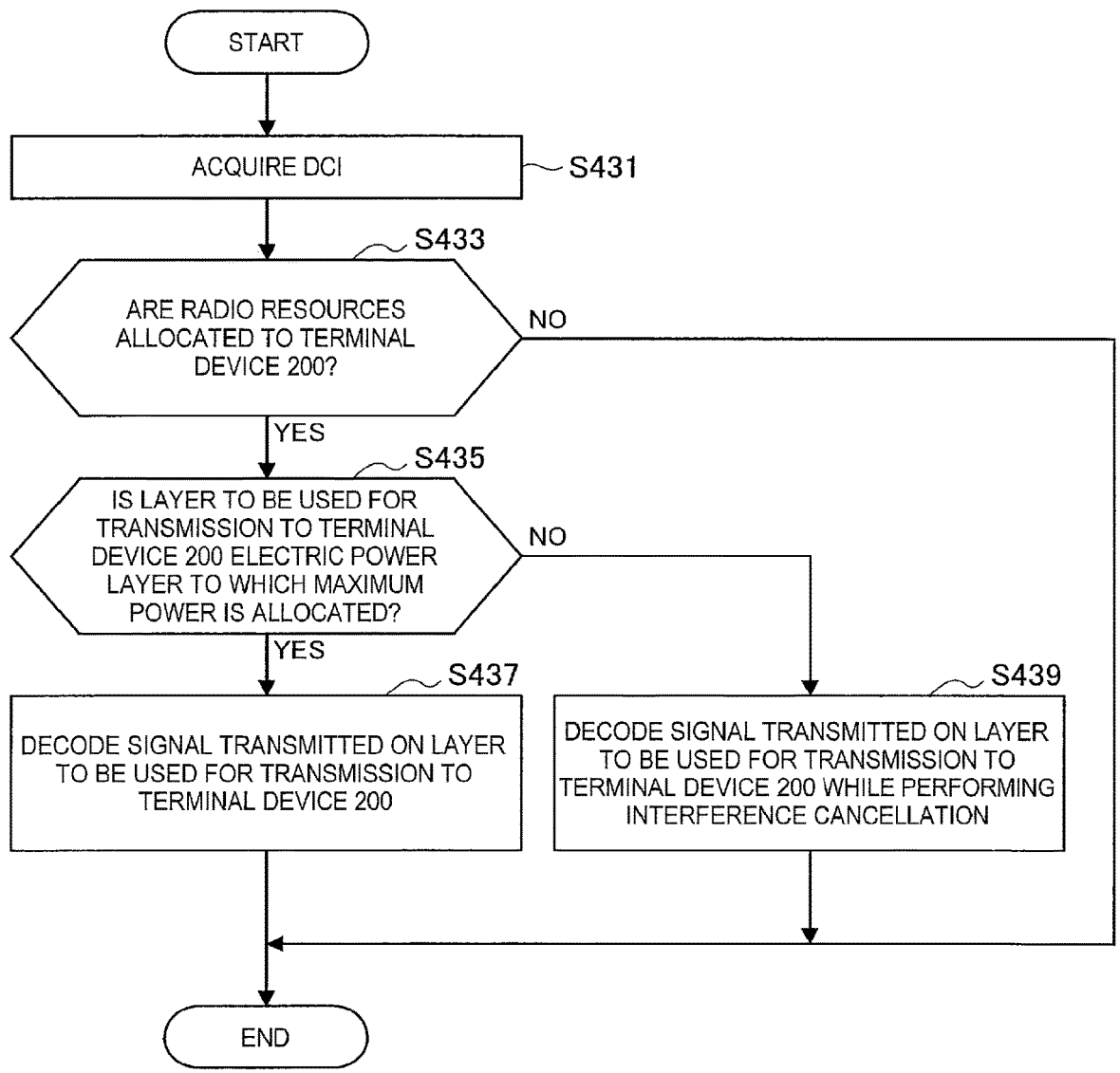
FIG. 17 is a sequence diagram illustrating an example of a schematic flow of a process of a terminal device according to the embodiment.

FIG. 17 is a sequence diagram illustrating an example of a schematic flow of a process of the terminal device 200 according to the embodiment of the present disclosure. The process corresponds to Steps S413 and S417 illustrated in FIG. 16. The process can be performed for each subframe.

The terminal device 200 (the information acquisition unit 241) acquires the DCI (S431).

When radio resources are allocated to the terminal device 200 (S433: YES), if a layer to be used for transmission to the terminal device 200 is a layer to which maximum power is allocated (S435: YES), the terminal device 200 (the reception processing unit 247) decodes a signal transmitted on the layer (S437). Then, the process ends.

On the other hand, if the layer to be used for transmission to the terminal device 200 is not a layer to which maximum power is allocated (S435: NO), the terminal device 200 (the reception processing unit 247) decodes a signal transmitted on the at least one layer while performing interference cancellation (S439). For example, the terminal device 200 (the reception processing unit 247) generates a signal transmitted on another layer as an interference replica signal in the interference cancellation, and removes the interference replica signal from reception power of the CC. Then, the process ends.

When no radio resources are allocated to the terminal device 200 (S433: NO), the process ends.

Note that non-orthogonal multiple access using power allocation (e.g., SPC-NOMA) is not applied at all times, and may be applied as necessary. In that case, the DCI may include information indicating whether the non-orthogonal multiple access is applied (e.g., a bit), and the terminal device 200 may determine whether the non-orthogonal multiple access is applied (e.g., immediately after Step S433). If the non-orthogonal multiple access is applied, the process may proceed to Step S435, or if the non-orthogonal multiple access is not applied, the process may proceed to Step S437.

<<6. Modified Example>>

Next, a modified example of the embodiment of the present disclosure will be described with reference to FIGS. 18 to 25.

In the modified examples of the embodiment of the present disclosure, the plurality of layers include a first layer of which a length of a time frame is a first length and a second layer of which a length of a time frame is a second length that is shorter than the first length. That is, there are time frames having different lengths between at least two layers among the plurality of layers. Accordingly, for example, latency can be further shortened.

(1) Time Frame
(a) Example of Time Frame

The time frame is, for example, a cycle of allocation of radio resources. More specifically, for example, the time frame is a subframe.

(b) Length of Time Frame

The first length is, for example, equal to a length of a time frame of another frequency band to which the non-orthogonal multiple access is not applied, and the second length is shorter than the length of the time frame of the other frequency band. That is, the time frame of the first layer has an equal length to that of a normal time frame, and the time frame of the second layer has a shorter length than that of the normal time frame.

The first length is, for example, an integral multiple of the second length. In addition, for example, each symbol included in the time frame of the first layer has an equal length to that of each symbol included in the time frame of the second layer. Examples of time frames will be described below with reference to FIGS. 18 and 19.

Figure 18:
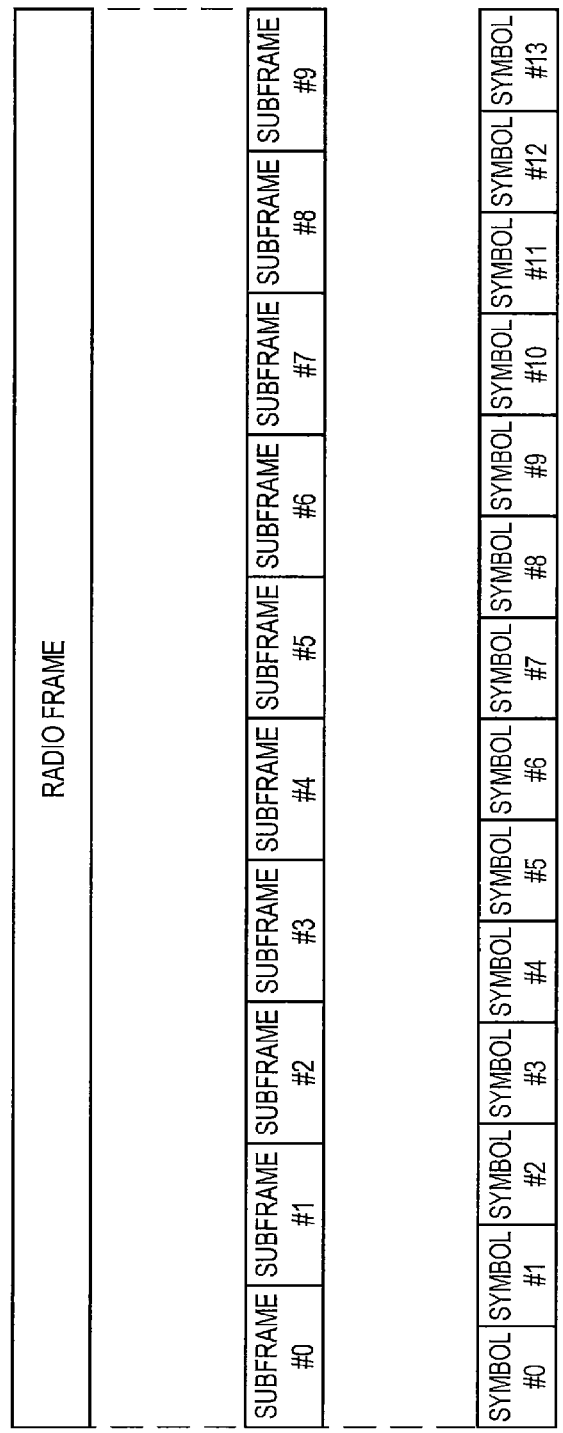
FIG. 18 is an illustrative diagram for describing a general frame configuration.

FIG. 18 is an illustrative diagram for describing a general frame configuration. Referring to FIG. 18, a radio frame is illustrated. The radio frame has, for example, a length of 10 ms and includes 10 subframes. In addition, each subframe has, for example, a length of 1 ms and includes 14 symbols.

Figure 19:
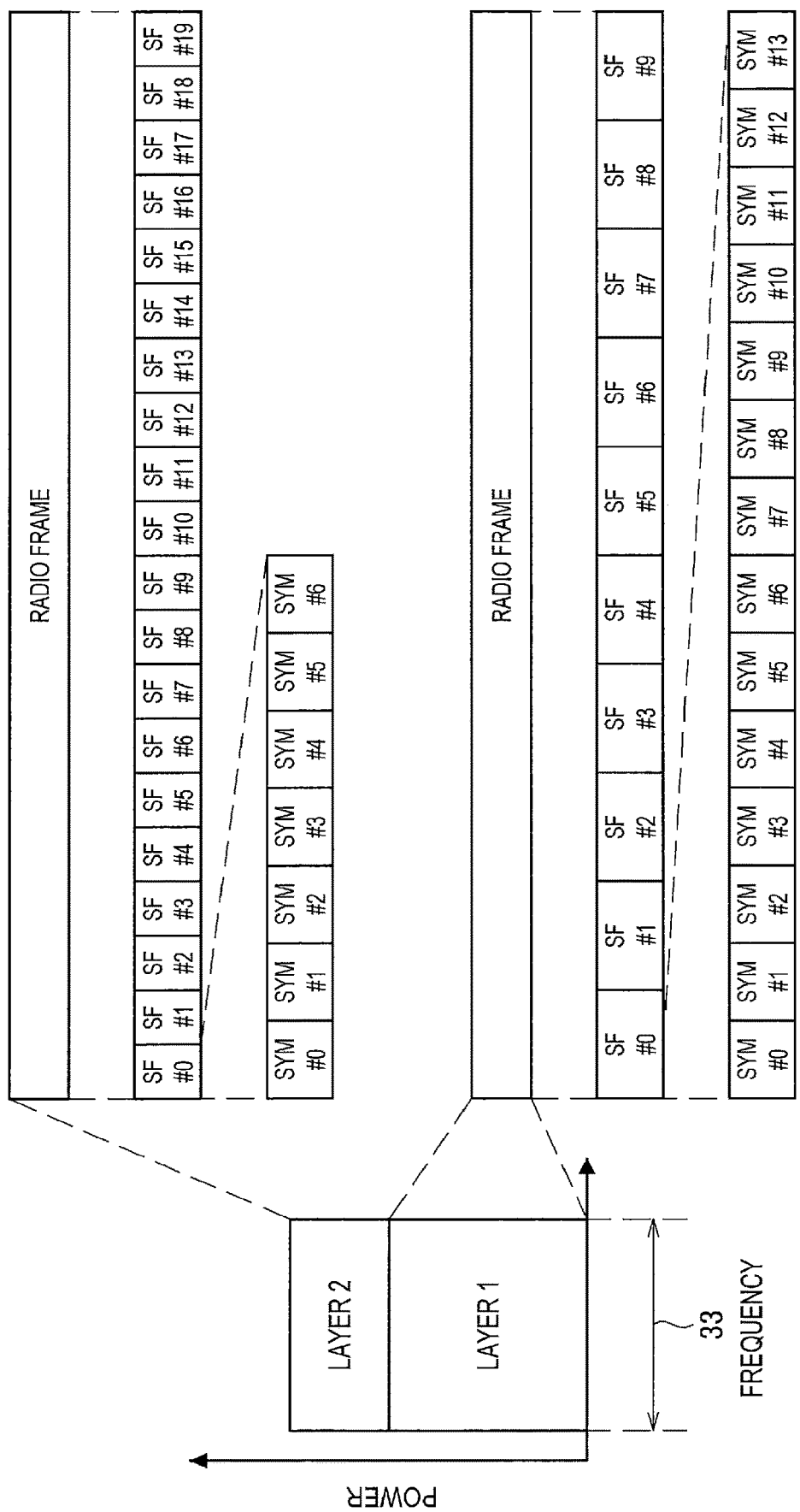
FIG. 19 is an illustrative diagram for describing an example of a frame configuration according to a modified example.

FIG. 19 is an illustrative diagram for describing an example of a frame configuration according to the modified example. Referring to FIG. 19, the layer 1 and the layer 2 of the CC 33 are illustrated. In this example, the layer 1 has a general frame configuration described with reference to FIG. 18. That is, the radio frame of the layer 1 has a length of 10 ms and includes 10 subframes. In addition, each subframe of the layer 1 has a length of 1 ms and includes 14 symbols. Meanwhile, the layer 2 has a frame configuration that is different from the general frame configuration. Specifically, the radio frame of the layer 2 has a length of 10 ms and includes 20 subframes. In addition, each subframe of the layer 2 has a length of 0.5 ms and includes 7 symbols. As described above, the lengths of subframes (cycles of allocation of radio resources) are different between the layer 1 and the layer 2. Furthermore, the CC 31 (not illustrated) that is different from the CC 33 also has a general frame configuration described with reference to FIG. 18, like the layer 1. That is, the length of the subframes of the layer 1 is equal to that of subframes of the CC 31.

Note that, since the length of each subframe of the layer 2 is shorter, the length of radio resources of the layer 2 is shorter in the time direction. As an example, although a pair of two resource blocks that are arranged in the time direction are allocated to the layer 1, only one resource block is allocated to the layer 2 in the time direction.

As described above, the layers have different lengths of time frames. Accordingly, for example, a unit of radio resources allocated to at least one layer decreases. The unit of radio resources allocated is changed, for example, from a pair of resource blocks to a single resource block. For this reason, radio resources can be allocated to more terminal devices within a certain period of time. As a result, legacy can be further shortened.

Note that, although the example in which the length of the radio frame is uniform regardless of a length of a subframe has been described, the modified example of the embodiment of the present disclosure is not limited thereto. The radio frame may include 10 subframes, for example, regardless of a length of a subframe. Specifically, when a length of a subframe is 0.5 ms, a length of a radio frame may be 5 ms.

(2) Real-time Property of Data and Layer

The base station 100 (the transmission processing unit 155) transmits, for example, a signal of data having a lower real-time property on the first layer and a signal of data having a higher real-time property on the second layer in the frequency band.

Referring to FIG. 19 again, the base station 100 transmits a signal of data having a lower real-time property on the layer 1 and a signal of data having a higher real-time property on the layer 2 in the CC 33 as an example. The data having the higher real-time property is, for example, audio data or video data.

Accordingly, latency of data having a higher real-time property can be shortened, for example.

Note that the base station 100 (the processing unit 150) may determine a real-time property of data on the basis of QoS Class Identifier (QCI). The QCI may be QCI of a bearer corresponding to the data. The QCI may be associated with characteristics of quality of service (QoS) as described below.

TABLE

| QCI | Resource Type | Priority | Packet Delay Budget | Packet Error Loss Rate | Example Services |
|---|---|---|---|---|---|
| 1 | GBR | 2 | 100 msec | $10^{-2}$ | Conversational Voice |
| 2 | | 4 | 150 msec | $10^{-3}$ | Conversational Voice (Live Streaming) |
| 3 | | 3 | 50 msec | $10^{-3}$ | Real Time Gaming |
| 4 | | 5 | 300 msec | $10^{-6}$ | Non-Conversational Video (Buffered Streaming) |
| 5 | Non-GBR | 1 | 100 msec | $10^{-6}$ | IMS Signaling |
| 6 | | 6 | 300 msec | $10^{-6}$ | Video (Buffered Streaming), TCP Based Applications |
| 7 | | 7 | 100 msec | $10^{-3}$ | Voice, Video (Live Streaming), Interactive Gaming |
| 8 | | 8 | 300 msec | $10^{-6}$ | Video (Buffered Streaming), TCP Based Applications |
| 9 | | 9 | 300 msec | $10^{-6}$ | Video (Buffered Streaming), TCP Based Applications |

As a first example, the base station 100 may determine data to have a high real-time property when a resource type associated with the QCI is Guaranteed Bit Rate (GBR). As a second example, the base station 100 may determine data to have a high real-time property when priority associated with the QCI is equal to or lower than a predetermined value (or is lower than the predetermined value) (i.e., priority is high). As a third example, the base station 100 may determine data to have a high real-time property when a Packet Delay Budget associated with the QCI is equal to or lower than a predetermined value (or is lower than the predetermined value) (i.e., a requirement for a delay is strict). As a fourth example, the base station 100 may determine data to have a high real-time property when a packet error loss rate associated with the QCI is higher than or equal to a predetermined value (or exceeds the predetermined value) (i.e., a certain degree of packet loss is allowed). As a fifth example, the base station 100 may determine data to have a high real-time property when the QCI a predetermined QCI. A frequency band and/or a layer can be more easily selected through the determination of a real-time property described above.

(3) Throughput/Data Size and Layer

The base station 100 (the transmission processing unit 155) may transmit a signal of information in a larger size on the first layer and a signal of information in a smaller size on the second layer in the frequency band. As an example, the information in the larger size may be data in a larger size, and information in the smaller size may be control information of data in a smaller size. Accordingly, the radio resources can be used more efficiently.

The base station 100 (the transmission processing unit 155) may transmit a signal of data that requires a higher throughput on the first layer and a signal of data that requires a lower throughput on the second layer in the frequency band. Accordingly, a high throughput can be gained for the data that requires a higher throughput.

(4) Signal Transmitted on Each Layer (a) Signal of Physical Data Channel

In the modified example, the base station 100 (the transmission processing unit 155) transmits, for example, a signal of a physical data channel on each of the plurality of layers in the frequency band.

(b) Signal of Control Channel

In the modified example, the base station 100 (the transmission processing unit 155) transmits, for example, a signal of a physical control channel in the frequency band.

(b-1) Transmission on One Layer

Also in the modified example, for example, the base station 100 (the transmission processing unit 155) transmits the signal of the physical control channel on one layer among the plurality of layers in the frequency band. In addition, the signal of the physical control channel includes, for example, a signal of scheduling information with respect to each of the plurality of layers. Furthermore, the one layer among the plurality of layers is, for example, a layer to which maximum transmission power is allocated among the plurality of layers. Examples of signals transmitted on each layer by the base station 100 will be described with reference to FIGS. 20 and 21.

Figure 20:
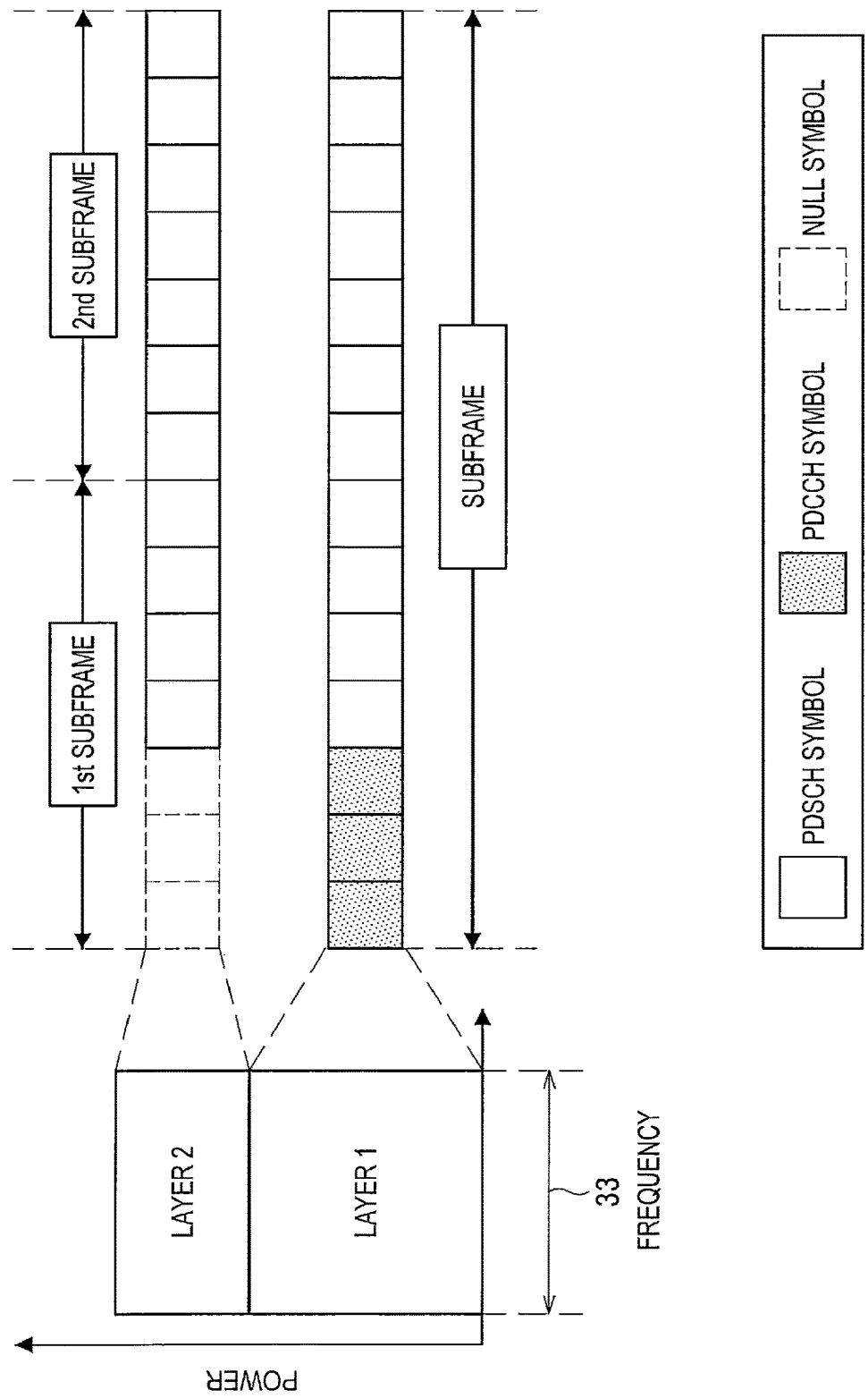
FIG. 20 is an illustrative diagram for describing a first example of a signal transmitted on layers by a base station according to the modified example.

FIG. 20 is an illustrative diagram for describing a first example of a signal transmitted on each layer by the base station 100 according to the modified example. Referring to FIG. 20, the layer 1 and the layer 2 of the CC 33 are illustrated. In this example, a length of a subframe of the layer 2 (i.e., a length of each of a first subframe and a second subframe of the layer 2) is half a length of a subframe of the layer 1. In addition, in this example, a first to a third symbols among the subframes of the layer 1 are symbols in which a PDCCH is deployed, and a first to a third symbols in the first subframe of the layer 2 are null symbols. That is, the base station 100 transmits a signal of the PDCCH in the first to the third symbols of the subframe in the layer 1, and transmits no signal in the first to the third symbols of the first subframe in the layer 2. Accordingly, communication quality of the layer 1 can be enhanced. The signal of the PDCCH transmitted on the layer 1 includes a signal of scheduling information with respect to the layer 1 and the layer 2. In particular, the signal of the PDCCH transmitted on the layer 1 includes a signal of scheduling information of the two subframes of the layer 2. Furthermore, a $4^{th}$ to a $14^{th}$ symbols of the subframe in the layer 1 are symbols in which a PDSCH is deployed, and a $4^{th}$ to a $7^{th}$ symbols of the first frame and all symbols of the second subframe in the layer 2 are symbols in which the PDSCH is deployed. That is, the base station 100 transmits the signal of the PDSCH in the $4^{th}$ to the $14^{th}$ symbols of the subframe in the layer 1, and transmits the signal of the PDSCH in the $4^{th}$ to the $7^{th}$ symbols of the first subframe and all the symbols of the second subframe in the layer 2.

Figure 21:
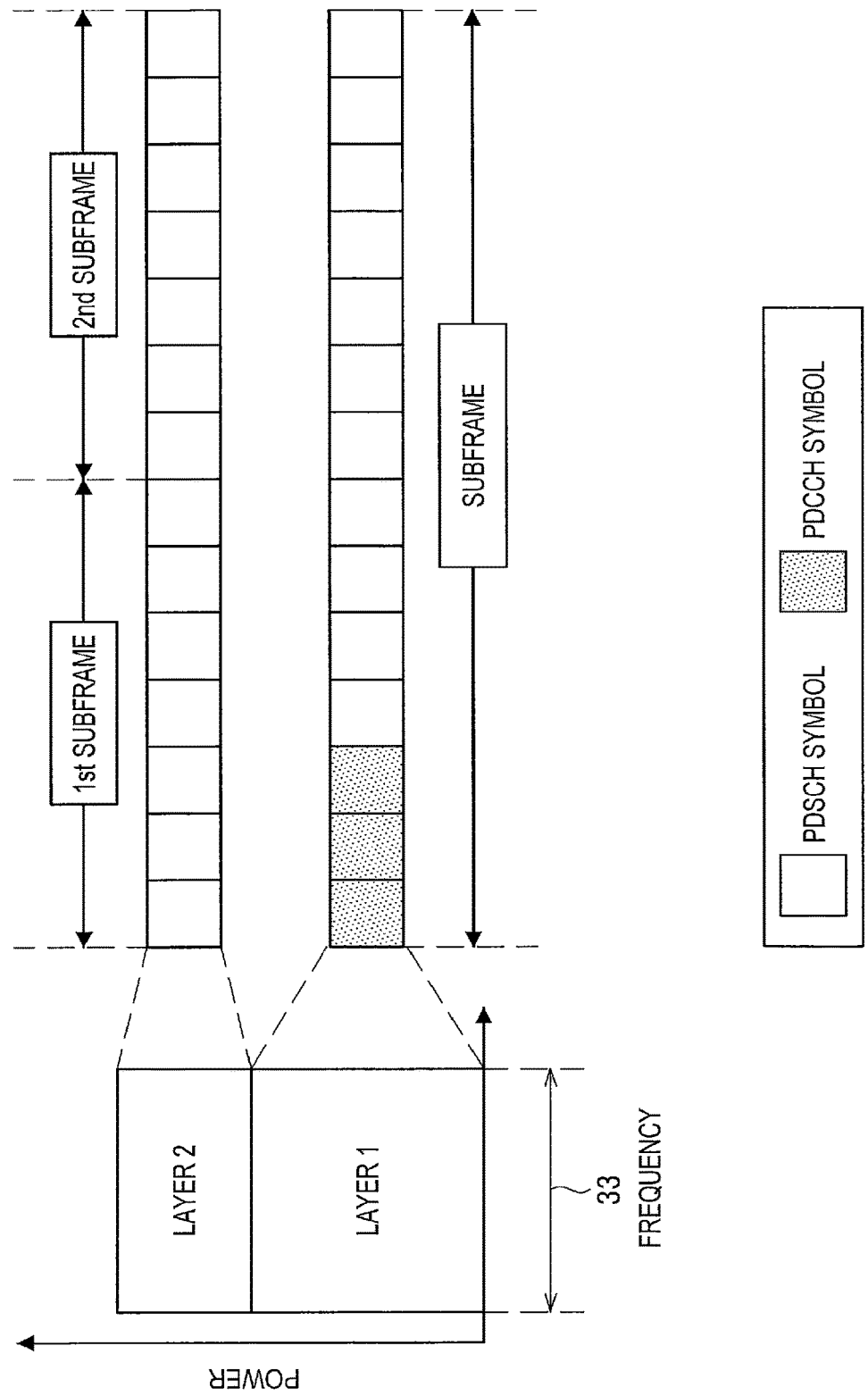
FIG. 21 is an illustrative diagram for describing a second example of a signal transmitted on layers by a base station according to the modified example.

FIG. 21 is an illustrative diagram for describing a second example of a signal transmitted on each layer by the base station 100 according to the modified example. Referring to FIG. 21, the layer 1 and the layer 2 of the CC 33 are illustrated. In this example, in particular, the first to the third symbols of the first subframe of the layer 2 are not null symbols, but symbols in which the PDSCH is deployed. That is, the base station 100 transmits the signal of the PDCCH in the first to the third symbols of the subframe in the layer 1, and transmits the signal of the PDSCH in the first to the third symbols of the first subframe in the layer 2. Accordingly, the base station 100 can transmit more data signals.

Note that the base station 100 (the transmission processing unit 155) may transmit a signal of the physical control channel without multiplexing in the frequency band, instead of transmitting the signal of the physical control channel on the one layer in the frequency band.

According to the first example, the terminal device 200 can acquire the scheduling information more easily. More specifically, the terminal device 200 can acquire the scheduling information without interference cancellation, for example, regardless of a layer to be used for transmission to the terminal device 200.

(a-2) Transmission on Each Layer

Also in the modified example, the base station 100 (the transmission processing unit 155) may transmit the signal of the physical control channel on each of the plurality of layers in the frequency band. An example of a signal transmitted on each layer by the base station 100 will be described below with reference to FIG. 22.

Figure 22:
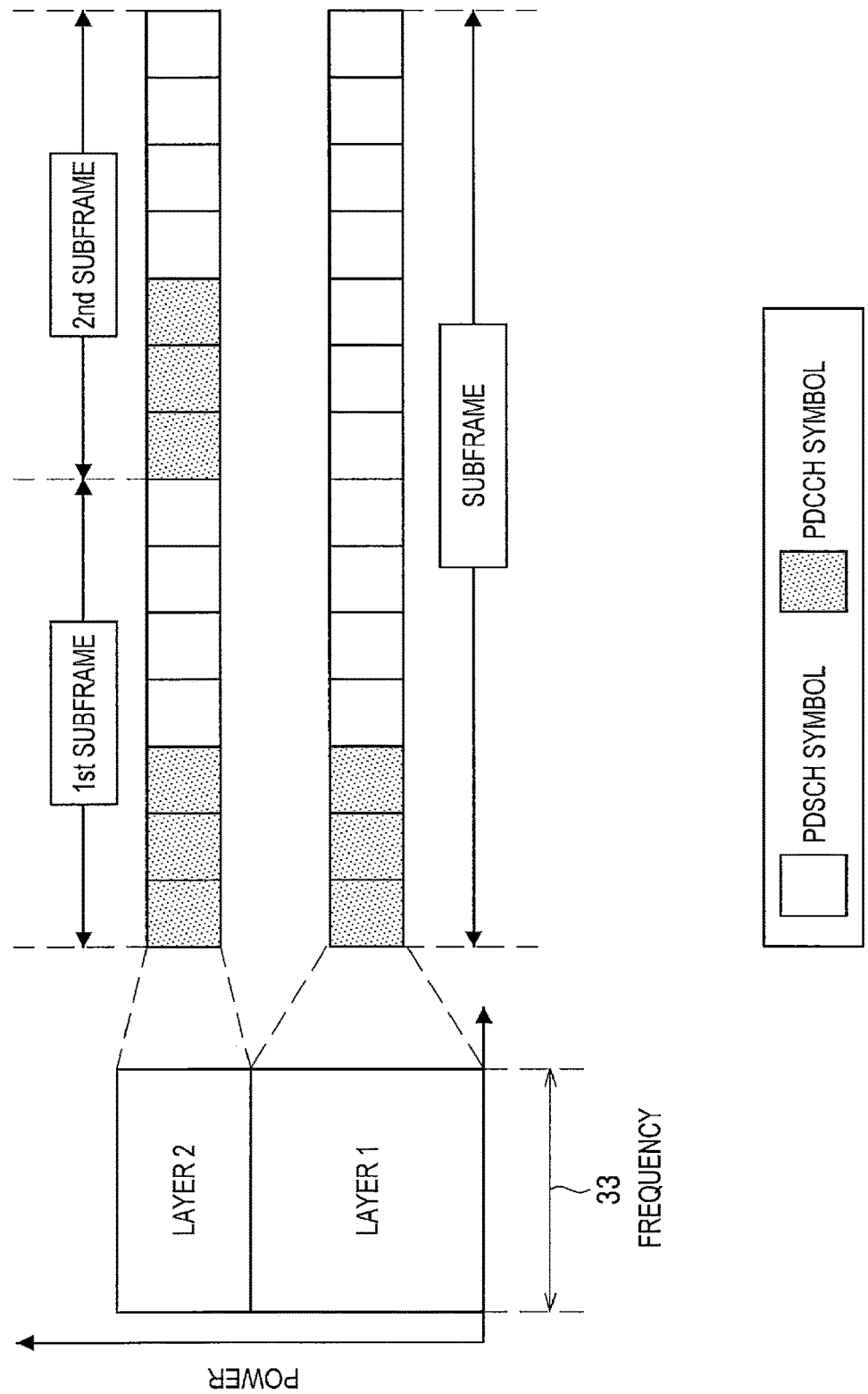
FIG. 22 is an illustrative diagram for describing a third example of a signal transmitted on layers by a base station according to the modified example.

FIG. 22 is an illustrative diagram for describing a third example of a signal transmitted on each layer by the base station 100 according to the modified example. Referring to FIG. 22, the layer 1 and the layer 2 of the CC 33 are illustrated. In this example, a length of a subframe of the layer 2 (i.e., a length of each of a first subframe and a second subframe of the layer 2) is half a length of a subframe of the layer 1. In addition, in this example, a first to a third symbols of each of the subframe of the layer 1 and the first and the second subframes of the layer 2 are symbols in which a PDCCH is deployed. That is, the base station 100 transmits the signal of the PDCCH in the first to the third symbols of the subframe in the layer 1, and transmits the signal of the PDCCH in the first to the third symbols of the first subframe and the first to the third symbols of the second subframe in the layer 2. The signal of the PDCCH transmitted on the layer 1 includes a signal of scheduling information with respect to the layer 1. Moreover, the signal of the PDCCH transmitted in the first subframe of the layer 2 includes a signal of scheduling information with respect to the first subframe, and the signal of the PDCCH transmitted in the second subframe of the layer 2 includes a signal of scheduling information with respect to the second subframe. A $4^{th}$ to a $14^{th}$ symbols of the subframe in the layer 1 are symbols in which a PDSCH is deployed, and a $4^{th}$ to a $7^{th}$ symbols of each of the first and the second subframes in the layer 2 are symbols in which a PDSCH is deployed. That is, the base station 100 transmits the signal of the PDSCH in the 4th to the 14th symbols of the subframe in the layer 1, and transmits the signal of the PDSCH in the 4th to the 7th symbols of each of the first and second subframes in the layer 2.

According to the second example described above, the scheduling information can be more simplified.

(a-3) Cross-frame Scheduling

In the modified example, the base station 100 (the transmission processing unit 155) may transmits a signal of a physical control channel on each of the plurality of layers in the frequency band. The third example is the same as the second example in this point. In the third example, in particular, the base station 100 (the transmission processing unit 155) may transmit a signal of a physical control channel in one time frame among a plurality of time frames in the second layer (i.e., the layer having a shorter time frame). The signal of the physical control channel transmitted in the one time frame includes a signal of scheduling information with respect to each of the plurality of time frames. This can be called cross-frame scheduling. An example of a signal transmitted on each layer by the base station 100 will be described with reference to FIG. 23.

Figure 23:
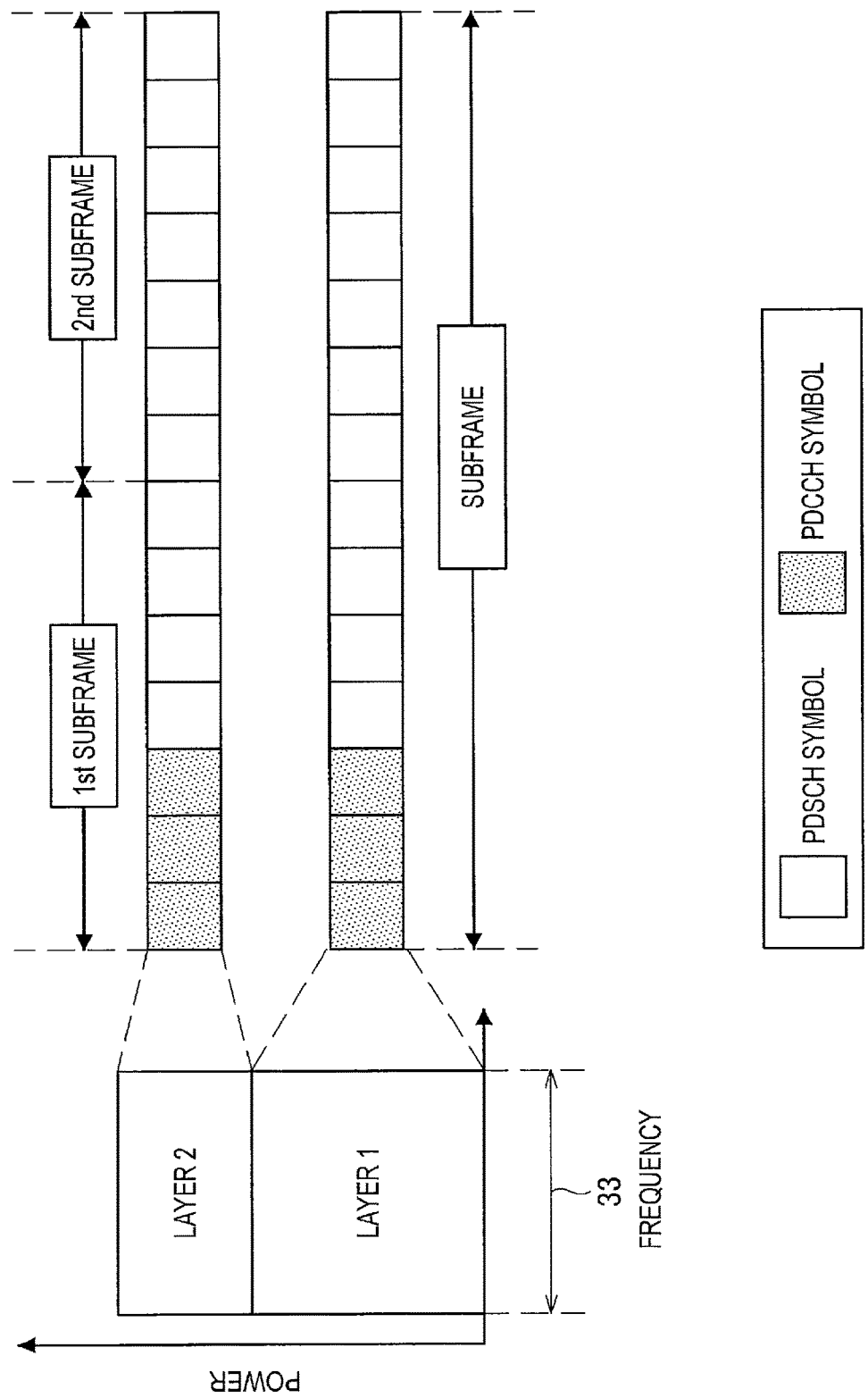
FIG. 23 is an illustrative diagram for describing a fourth example of a signal transmitted on layers by a base station according to the modified example.

FIG. 23 is an illustrative diagram for describing a fourth example of a signal transmitted on each layer by the base station 100 according to the modified example. Referring to FIG. 23, the layer 1 and the layer 2 of the CC 33 are illustrated. In this example, in particular, a first to the third symbols of the second subframe of the layer 2 are symbols in which a PDSCH is deployed, not a PDCCH. That is, the base station 100 transmits the signal of the PDSCH, not the PDCCH, in the first to the third symbols of the second subframe in the layer 2. Furthermore, particularly in this example, the signal of the PDCCH transmitted in the first subframe of the layer 2 includes a signal of scheduling information of the first subframe as well as a signal of scheduling information of the second subframe.

According to the third example, for example, the base station 100 can transmit more data signals.

(a-4) Cross-carrier Scheduling

In the modified example, the base station 100 (the transmission processing unit 155) may not transmit a signal of a physical control channel in the frequency band. Instead, the base station 100 (the transmission processing unit 155) may transmit the signal of the physical control channel in another frequency band, and the signal may include a signal of scheduling information with respect to each of the plurality of layers. That is, cross-carrier scheduling may be performed. An example of a signal transmitted on each layer by the base station 100 will be described below with reference to FIG. 24.

Figure 24:
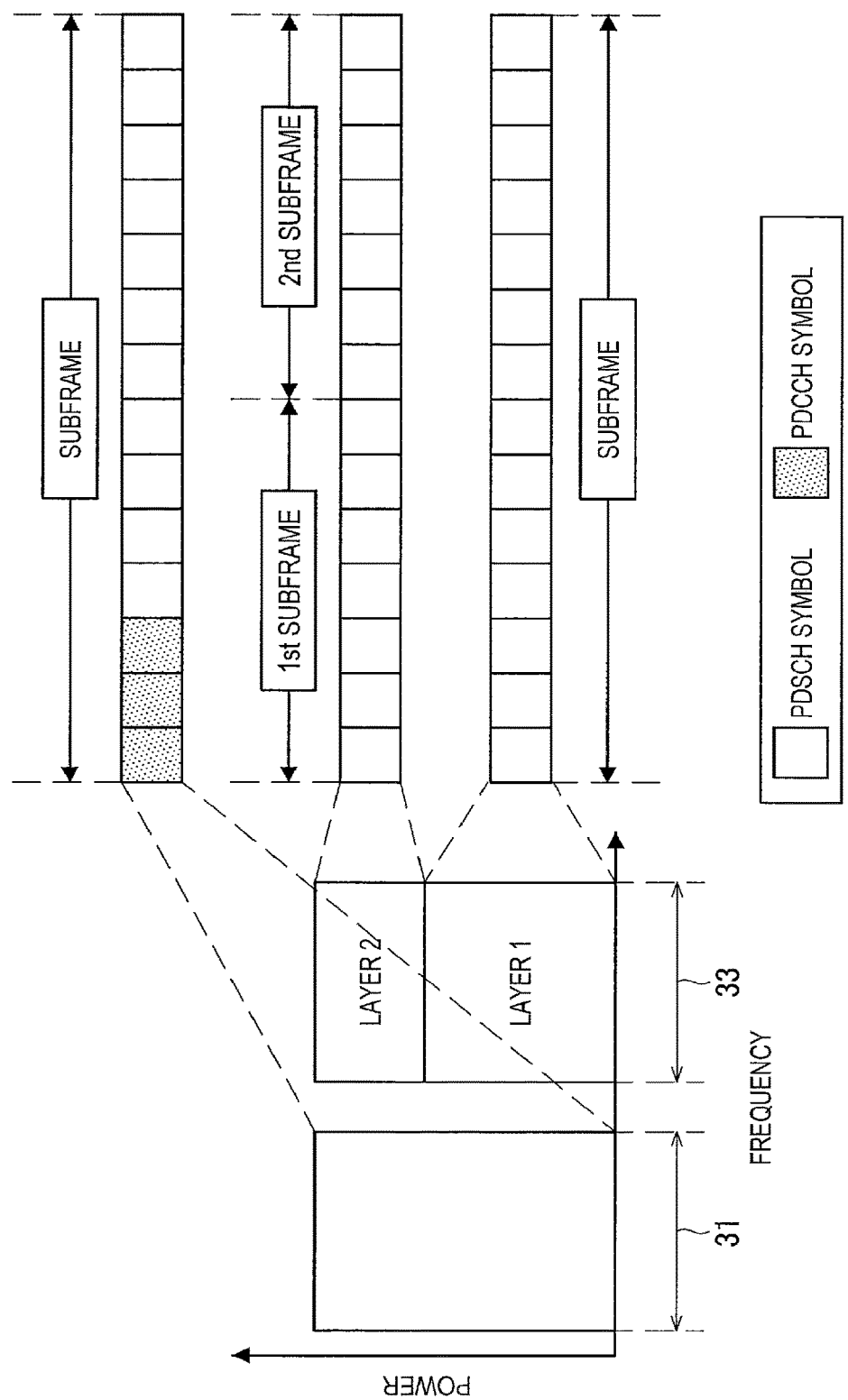
FIG. 24 is an illustrative diagram for describing a fifth example of a signal transmitted on layers by a base station according to the modified example.

FIG. 24 is an illustrative diagram for describing a fifth example of a signal transmitted on each layer by the base station 100 according to the modified example. Referring to FIG. 24, the CC 31 and the CC 33 are illustrated, and the layer 1 and the layer 2 of the CC 33 are further illustrated. In this example, a length of a subframe of the layer 2 of the CC 33 (i.e., a length of each of the first subframe and the second subframe of the layer 2) is half a length of the subframe of the layer 1 of the CC 33. The length of the subframe of the layer 1 of the CC 33 is equal to a length of a subframe of the CC 31. In addition, in this example, a PDCCH is deployed in neither the layer 1 nor the layer 2 of the CC 33. Instead, a PDCCH is deployed in the CC 31, and scheduling information of the layer 1 and the layer 2 of the CC 33 is transmitted in the PDCCH. That is, the base station 100 transmits a signal of the PDCCH in a first to a third symbols of the CC 31, and the signal includes a signal of the scheduling information of the layer 1 and the layer 2 of the CC 33. Note that all symbols of the subframe of the layer 1 and all symbols of the first and the second subframes of the layer 2 of the CC 33 are symbols in which a PDSCH is deployed. That is, the base station 100 transmits a signal of the PDSCH in all the symbols of the layer 1 and the layer 2.

(b) Other Signals

Further, for example, the base station 100 also transmits another signal (e.g., a synchronization signal and/or a signal of a PBCH) in the frequency band. Description of this point is as described above.

(5) Others

The base station 100 may alter the length of the time frame of the second layer. For example, the base station 100 may alter the length of the time frame of the second layer dynamically or semi-statically. In addition, the base station 100 may also alter a length of a time frame of another layer among the plurality of layers. An example of an alteration of a length of a time frame will be described below with reference to FIG. 25.

Figure 25:
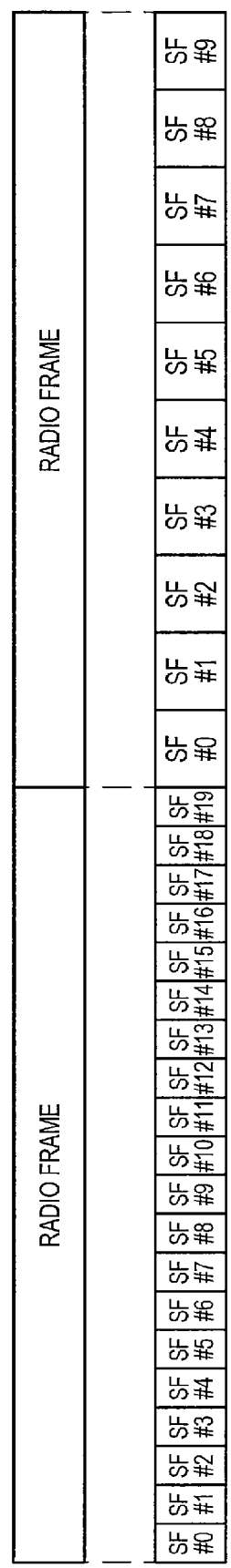
FIG. 25 is an illustrative diagram for describing an example of an alteration of a length of a time frame.

FIG. 25 is an illustrative diagram for describing an example of an alteration of a length of a time frame. Referring to FIG. 25, two radio frames are illustrated. A first radio frame includes, for example, 20 subframes each of which has a length of 0.5 ms. The base station 100 alters the length of the subframe from 0.5 ms to 1 ms after an end of the first radio frame. Thus, a second radio frame includes 10 subframes each of which has a length of 1 ms.

<<7. Another Embodiment>>

Next, another embodiment will be described with reference to FIG. 26.

<7.1. Technical Problem>

First, a technical problem according to the other embodiment will be described.

There are a variety of requirements for a cellular system. One of the requirements is latency. Latency means a time taken to perform, for example, a round-operation from transmission of data by a transmission device to reception of an ACK/NACK by the transmission device (a delay time). Alternatively, latency may mean a time taken to perform a round-operation to complete transmission and reception of one transport block (TB), or a time taken to perform a round-operation to complete transmission and reception of one packet (e.g., IP packet) of a higher-order layer. A real-time property may not be secured if latency is long, for example, and thus it is desirable in a cellular system to further shorten latency.

Therefore, it is desirable to provide a mechanism that can further shorten latency in cellular system.

<7.2. Technical Feature>

Next, a technical feature of the other embodiment will be described with reference to FIG. 26.

In the other embodiment, the base station 100 transmits a signal in a first frequency band and a second frequency band, and a time frame of the second frequency band is shorter than a time frame of the first frequency band. For example, a length of the time frame of the first frequency band is a first length, and a length of the time frame of the second frequency band is a second length that is shorter than the first length. That is, lengths of time frames are different between the frequency bands. Accordingly, for example, latency can be further shortened.

(1) Frequency Bands

Each of the first frequency band and the second frequency band is, for example, a component carrier.

Note that the base station 100 may of course use a frequency band (e.g., a component carrier) in addition to the first frequency band and the second frequency band.

(2) Time Frame (a) Example of Time Frame

The time frames each is, for example, a cycle of allocation of radio resources. More specifically, for example, the time frames are subframes.

(b) Length of Time Frame

The time frame of the first frequency band is, for example, has an equal length to a length of a normal time frame, and the time frame of the second frequency band is shorter than that of the normal time frame.

The first length (the length of the time frame of the first frequency band) is, for example, an integral multiple of the second length (the length of the time frame of the second frequency band). In addition, each symbol included in the time frame of the first frequency band has, for example, an equal length to that of each symbol included in the time frame of the second frequency band. An example of time frames will be described below with reference to FIG. 26.

Figure 26:
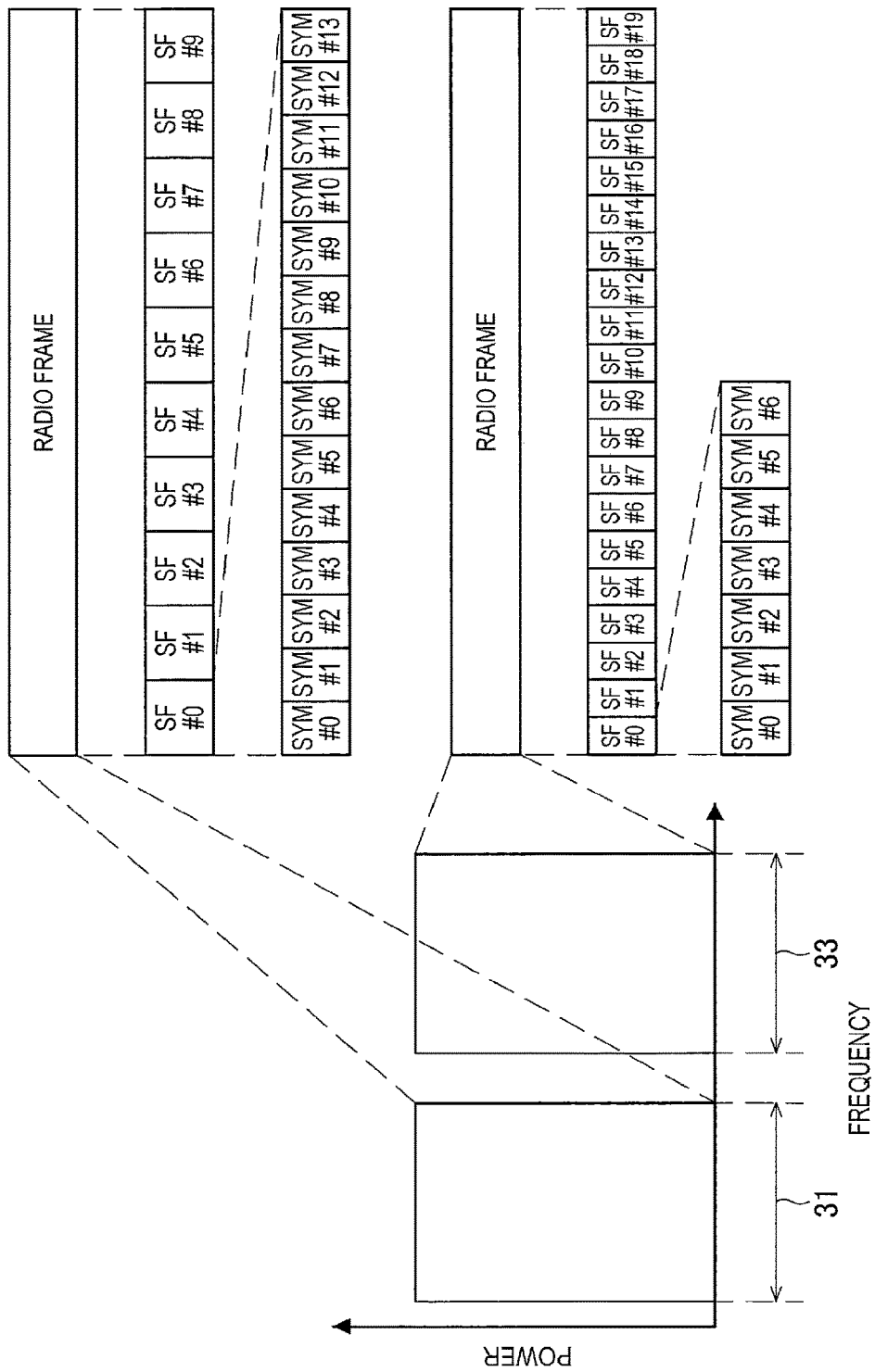
FIG. 26 is an illustrative diagram for describing an example of a frame configuration according to another embodiment.

FIG. 26 is an illustrative diagram for describing an example of a frame configuration according to the other embodiment. Referring to FIG. 26, a CC 31 and a CC 33 are illustrated. In this example, the CC 31 has the general frame configuration described with reference to FIG. 18. That is, a radio frame of the CC 31 has a length of 10 ms and includes 10 subframes. In addition, each subframe of the CC 31 has a length of 1 ms and includes 14 symbols. Meanwhile, the CC 33 has a frame configuration that is different from the general frame configuration. Specifically, a radio frame of the CC 33 has a length of 10 ms and includes 20 subframes. In addition, each subframe of the CC 33 has a length of 0.5 ms and includes 7 symbols. As described above, the lengths of each subframe (a cycle of allocation of radio resources) are different between the CC 31 and the CC 33.

Note that, since a time frame of the CC 33 is shorter, radio resources of the CC 33 are accordingly shorter in the time direction. As an example, although a pair of two resource blocks arranged in the time direction are allocated to the CC 31, only one resource block is allocated to CC 33 in the time direction.

As described above, lengths of time frames are different between the frequency bands (e.g., CCs). Accordingly, for example, a unit of radio resources allocated to at least one frequency band is small. For example, radio resources allocated are changed, for example, from a pair of resource blocks to a single resource block. For this reason, radio resources can be allocated to more terminal devices within a certain period of time. As a result, legacy can be further shortened.

(2) Real-time Property of Data and Frequency Band

The base station 100 (the transmission processing unit 155) transmits, for example, a signal of data having a lower real-time property in the first frequency band and a signal of data having a higher real-time property in the second frequency band.

Referring to FIG. 26 again, the base station 100 transmits a signal of data having a lower real-time property in the CC 31 and a signal of data having a higher real-time property in the CC 33, as an example. The data having a higher real-time property is, for example, audio data or video data.

Accordingly, latency of data having a higher real-time property, for example, can be further shortened.

Note that the base station 100 (the processing unit 150) may determine a real-time property of data on the basis of an QCI. The QCI may be a QCI of a bearer corresponding to the data. Description of this point is the same as that in the above-described modified example. Thus, overlapping description is omitted here.

(3) Throughput/Data Size and Frequency Band

The base station 100 (the transmission processing unit 155) may transmit a signal of information in a larger size in the first frequency band and a signal a signal of information in a smaller size in the second frequency band. As an example, the information in the larger size may be data in a larger size, and the information in the smaller size may be control information or data in a smaller size. Accordingly, radio resources can be used more efficiently.

The base station 100 (the transmission processing unit 155) may transmit a signal of data that requires a higher throughput in the first frequency band and a signal of data that requires a lower throughput in the second frequency band. Accordingly, a high throughput can be gained for the data that requires a higher throughput.

(4) Others

The base station 100 may alter the length of the time frame of the second frequency band. For example, the base station 100 may alter the length of the time frame of the second frequency band dynamically or semi-statically. In addition, the base station 100 may also alter a length of a time frame of another frequency band (e.g., the first frequency band, or the like).

<<8. Application Example>>

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function. Furthermore, at least some of constituent elements of the base station 100 may be realized in a base station device or a module for a base station device.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least some of constituent elements of the terminal device 200 may be realized in a module mounted in such a terminal (for example, an integrated circuit module configured in one die).

<8.1. Application Example with Regard to Base Station>

(First Application Example)

Figure 27:
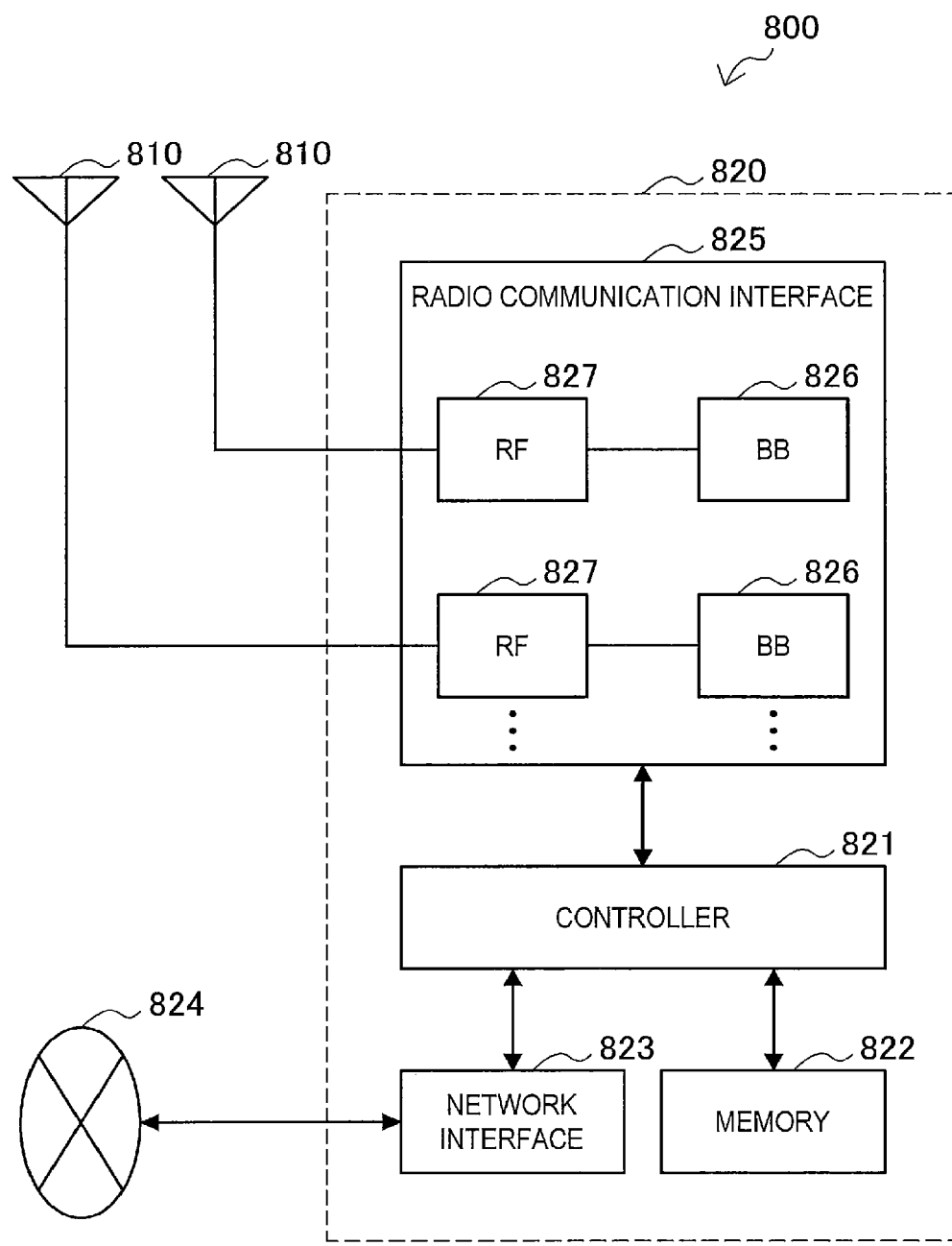
FIG. 27 is a block diagram illustrating a first example of a schematic configuration of an eNB.

FIG. 27 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 27. For example, the multiple antennas 810 may be compatible with multiple frequency bands used by the eNB 800. Although FIG. 27 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 27. For example, the multiple BB processors 826 may be compatible with multiple frequency bands used by the eNB 800. The radio communication interface 825 may include the multiple RF circuits 827, as illustrated in FIG. 27. For example, the multiple RF circuits 827 may be compatible with multiple antenna elements. Although FIG. 27 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 27, one or more structural elements included in the processing unit 150 (the selection unit 151, the notification unit 153, the transmission processing unit 155 and/or the reception processing unit 157) described with reference to FIG. 7 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the radio communication interface 825 (for example, the BB processor 826) and/or the controller 821 may execute the program. As described above, the eNB 800, the base station device 820, or the module may be provided as a device which includes the one or more structural elements, and the program for causing the processor to function as the one or more structural elements may be provided. In addition, a readable recording medium in which the program is recorded may be provided.

In addition, in the eNB 800 shown in FIG. 27, the radio communication unit 120 described with reference to FIG. 7 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823.

(Second Application Example)

Figure 28:
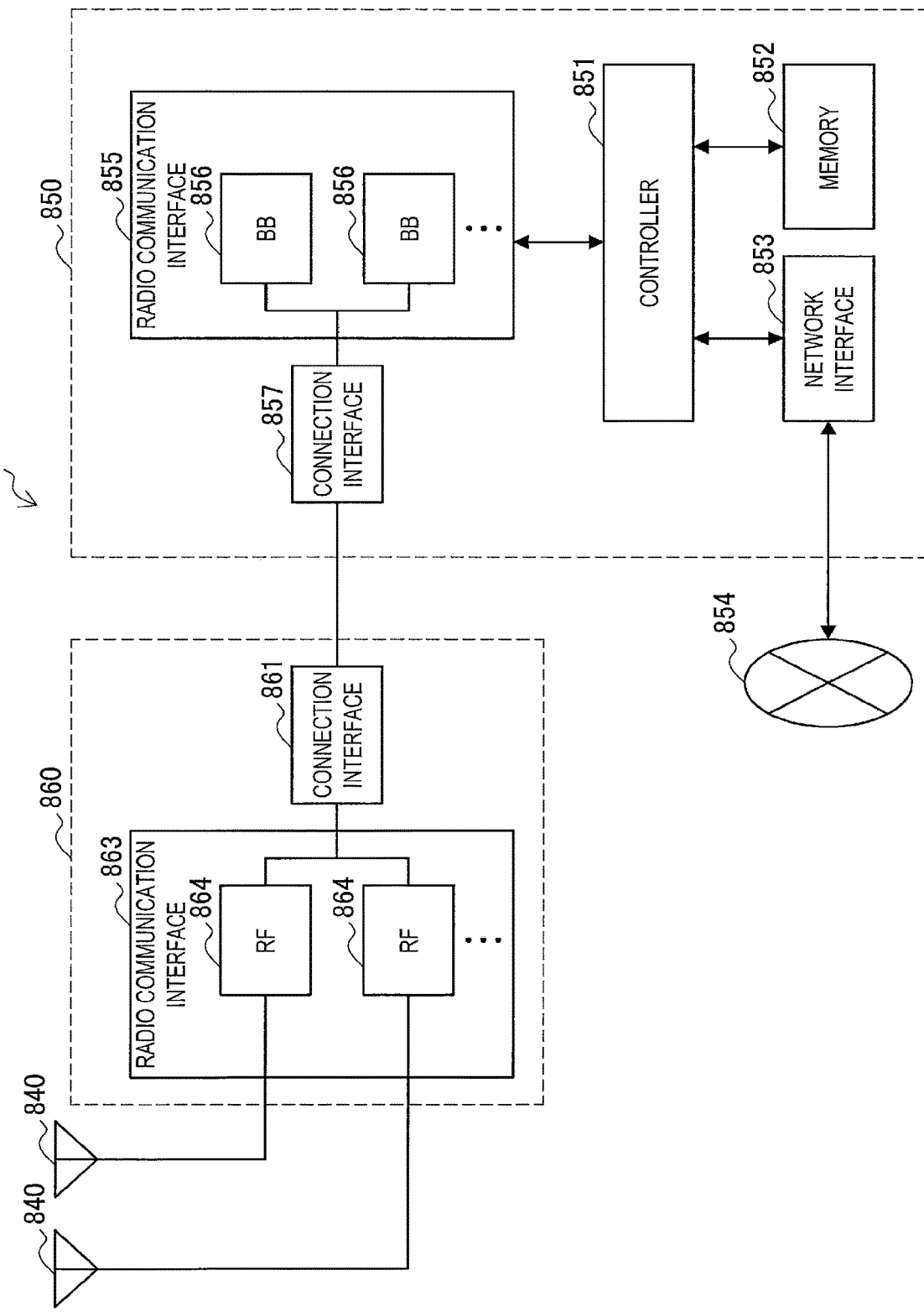
FIG. 28 is a block diagram illustrating a second example of the schematic configuration of the eNB.

FIG. 28 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 28. For example, the multiple antennas 840 may be compatible with multiple frequency bands used by the eNB 830. Although FIG. 28 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 27.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 27, except the BB processor 856 is connected to the RF circuit 864 of the RRH 860 via the connection interface 857. The radio communication interface 855 may include the multiple BB processors 856, as illustrated in FIG. 28. For example, the multiple BB processors 856 may be compatible with multiple frequency bands used by the eNB 830. Although FIG. 28 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 28. For example, the multiple RF circuits 864 may support multiple antenna elements. Although FIG. 28 illustrates the example in which the radio communication interface 863 includes the multiple RF circuits 864, the radio communication interface 863 may also include a single RF circuit 864.

In the eNB 830 shown in FIG. 28, one or more structural elements included in the processing unit 150 (the selection unit 151, the notification unit 153, the transmission processing unit 155 and/or the reception processing unit 157) described with reference to FIG. 7 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the radio communication interface 855 (for example, the BB processor 856) and/or the controller 851 may execute the program. As described above, the eNB 830, the base station device 850, or the module may be provided as a device which includes the one or more structural elements, and the program for causing the processor to function as the one or more structural elements may be provided. In addition, a readable recording medium in which the program is recorded may be provided.

Figure 7:
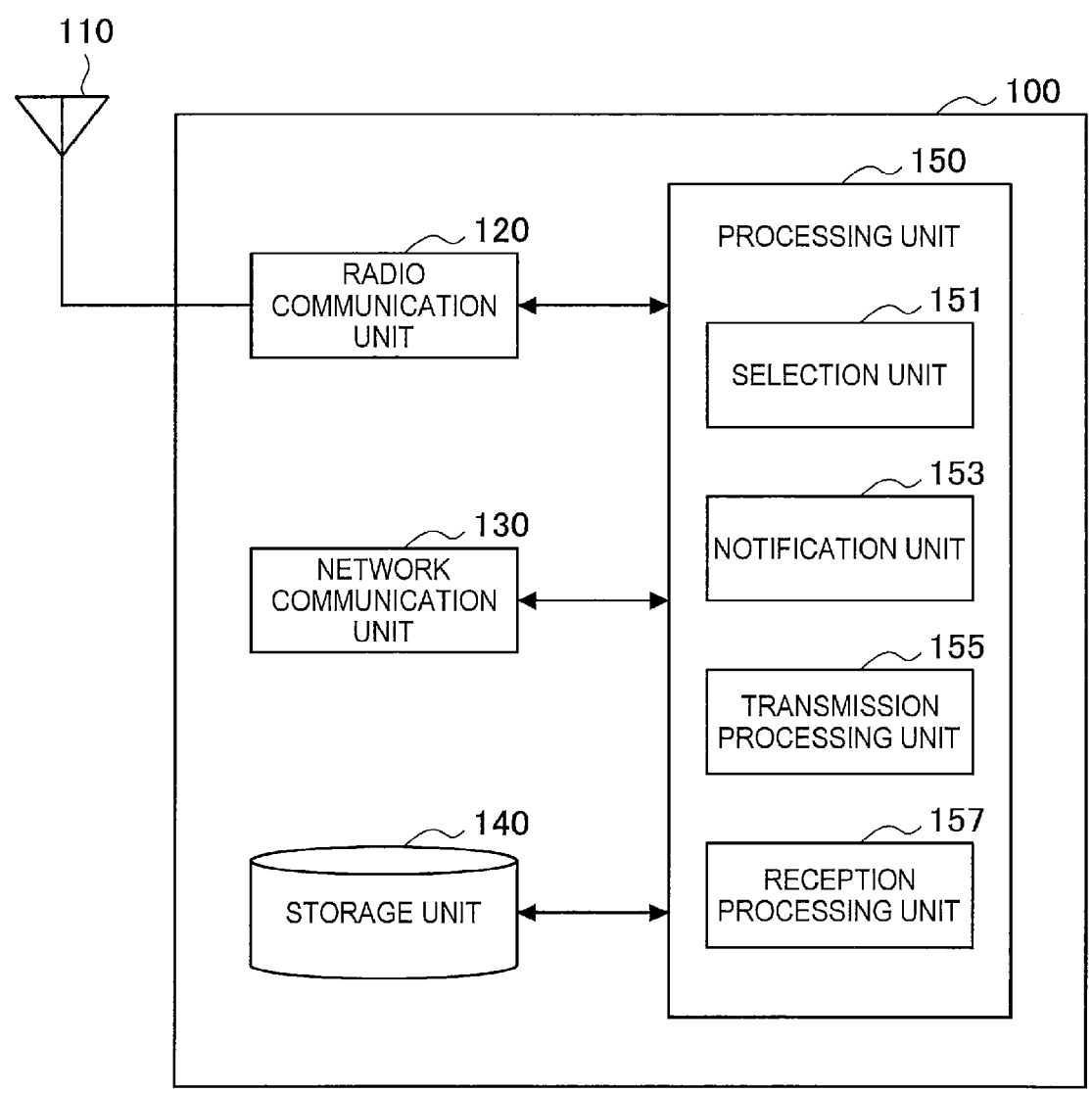
FIG. 7 is a block diagram illustrating an example of a configuration of a base station according to the embodiment.

In addition, in the eNB 830 shown in FIG. 28, the radio communication unit 120 described, for example, with reference to FIG. 7 may be implemented by the radio communication interface 863 (for example, the RF circuit 864). Moreover, the antenna unit 110 may be implemented by the antenna 840. In addition, the network communication unit 130 may be implemented by the controller 851 and/or the network interface 853.

<8.2. Application Example with Regard to Terminal Device>

(First Application Example)

Figure 29:
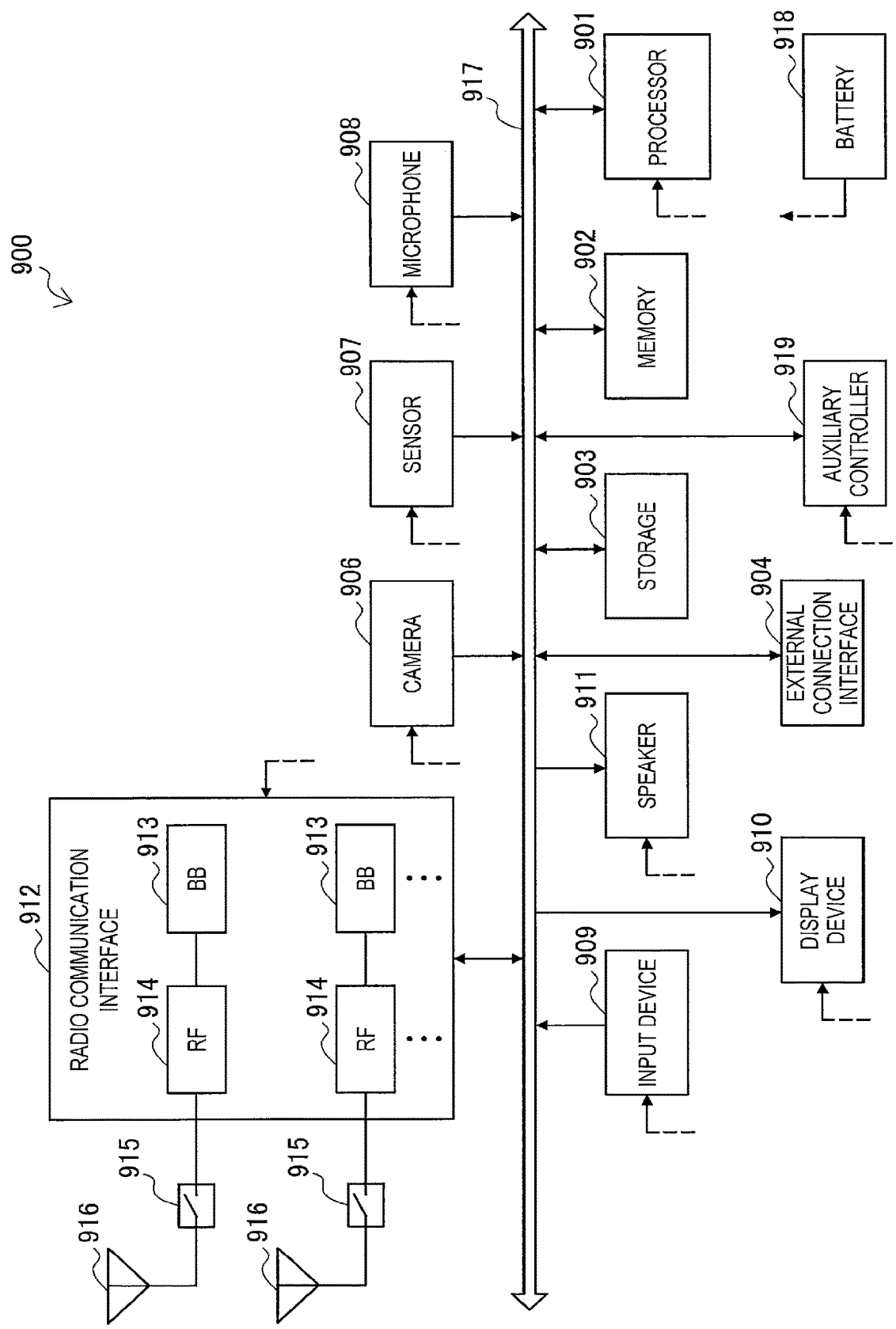
FIG. 29 is a block diagram illustrating an example of a schematic configuration of a smartphone.

FIG. 29 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE- Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 29. Although FIG. 29 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 29. Although FIG. 29 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 29 via feeder lines, which are partially shown as dashed lines in the figure. The auxiliary controller 919 operates a minimum necessary function of the smartphone 900, for example, in a sleep mode.

In the smartphone 900 shown in FIG. 29, one or more structural elements included in the processing unit 240 described with reference to FIG. 8 (the information acquisition unit 241, the notification unit 243, the transmission processing unit 245 and/or the reception processing unit 247) may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the radio communication interface 912 (for example, the BB processor 913), the processor 901 and/or the auxiliary controller 919 may execute the program. As described above, the smartphone 900 or the module may be provided as a device which includes the one or more structural elements, and the program for causing the processor to function as the one or more structural elements may be provided. In addition, a readable recording medium in which the program is recorded may be provided.

Figure 8:
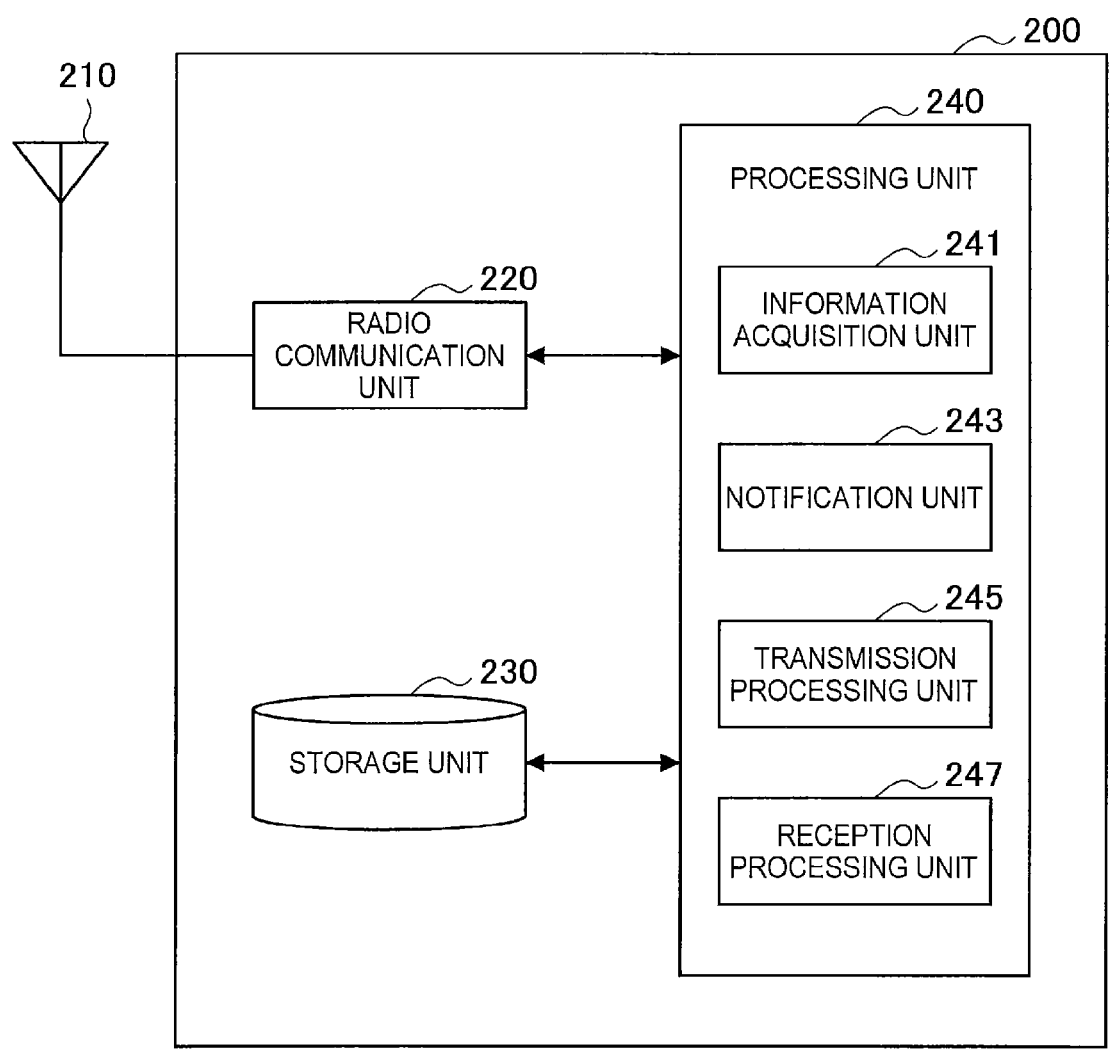
FIG. 8 is a block diagram illustrating an example of a configuration of a terminal device according to the embodiment.

In addition, in the smartphone 900 shown in FIG. 29, the radio communication unit 220 described, for example, with reference to FIG. 8 may be implemented by the radio communication interface 912 (for example, the RF circuit 914). Moreover, the antenna unit 210 may be implemented by the antenna 916.

(Second Application Example)

Figure 30:
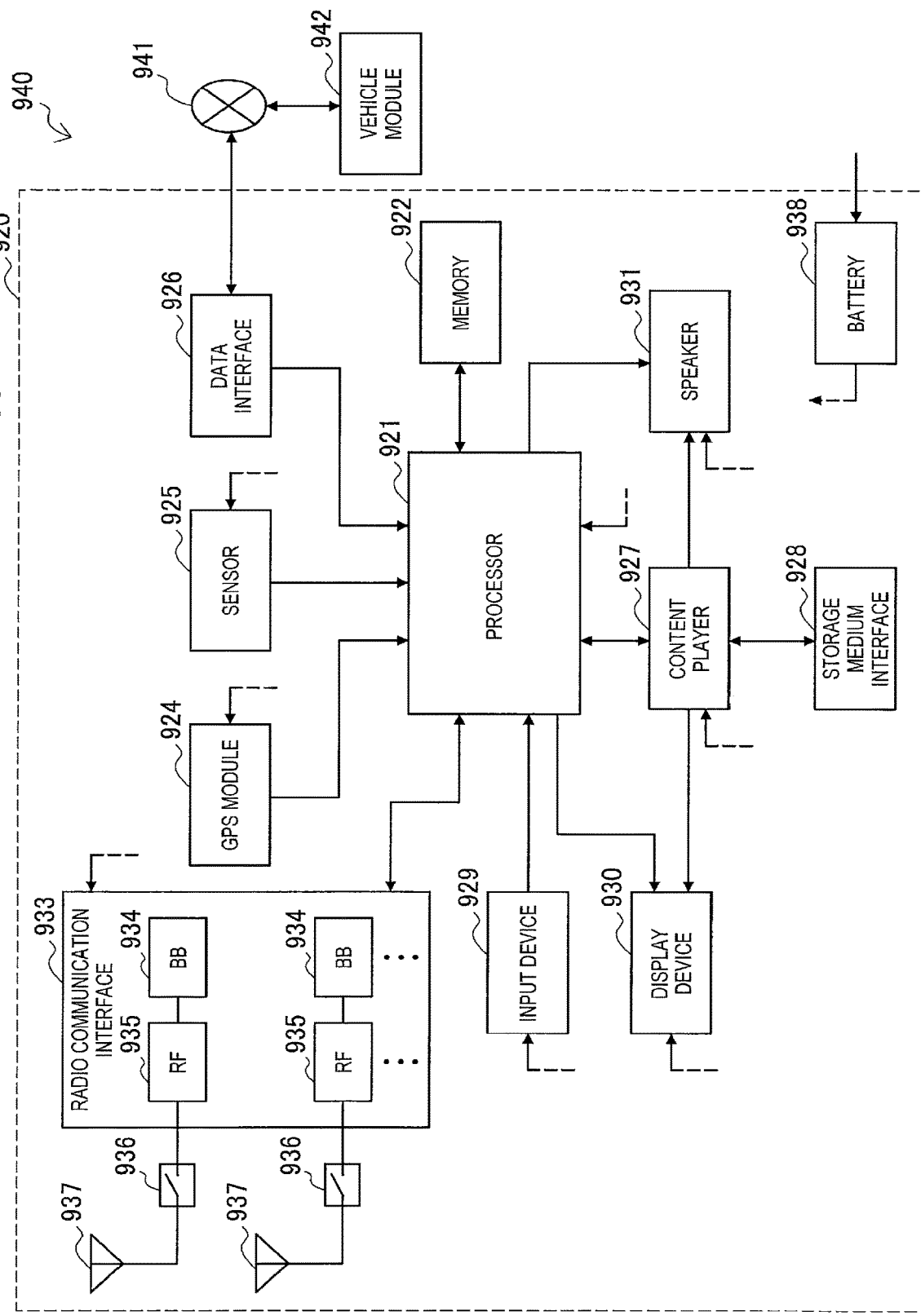
FIG. 30 is a block diagram illustrating an example of a schematic configuration of a car navigation device.

FIG. 30 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 30. Although FIG. 30 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 30. Although FIG. 30 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 30 via feeder lines that are partially shown as dashed lines in the figure. The battery 938 accumulates power supplied form the vehicle.

In the car navigation device 920 shown in FIG. 30, one or more structural elements included in the processing unit 240 described with reference to FIG. 8 (the information acquisition unit 241, the notification unit 243, the transmission processing unit 245, and/or the reception processing unit 247) may be implemented by the radio communication interface 933. Alternatively, at least some of these constituent elements may be implemented by the processor 921. As an example, a module which includes a part (for example, the BB processor 934) or all of the radio communication interface 933 and/or the processor 921 may be mounted in the car navigation device 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation device 920, and the radio communication interface 933 (for example, the BB processor 934) and/or the processor 921 may execute the program. As described above, the car navigation device 920 or the module may be provided as a device which includes the one or more structural elements, and the program for causing the processor to function as the one or more structural elements may be provided. In addition, a readable recording medium in which the program is recorded may be provided.

In addition, in the car navigation device 920 shown in FIG. 30, the radio communication unit 220 described, for example, with reference to FIG. 8 may be implemented by the radio communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the one or more structural elements (the information acquisition unit 241, the notification unit 243, the transmission processing unit 245, and/or the reception processing unit 247). The vehicle module 942 generates vehicle data such as vehicle speed, engine speed, and trouble information, and outputs the generated data to the in-vehicle network 941.

<<9. Conclusion>>

So far, devices and processes according to embodiments of the present disclosure have been described with reference to FIGS. 3 to 30.

According to the embodiment of the present disclosure, the base station 100 includes the selection unit 151 which selects a frequency band to which non-orthogonal multiple access is applied and at least one layer among a plurality of layers that are to be multiplexed in the frequency band for the non-orthogonal multiple access as a band and a layer to be used for transmission the terminal device 200, and the notification unit 153 which notifies the terminal device 200 of the frequency band and the at least one layer.

In addition, according to the embodiment of the present disclosure, the terminal device 200 includes the information acquisition unit 241 which acquires band information indicating the frequency band that is a frequency band to which non-orthogonal multiple access is applied and is selected as a band to be used for transmission to the terminal device and layer information indicating the at least one layer which is at least one layer among the plurality of layers that are to be multiplexed in the frequency band for the non-orthogonal multiple access and is selected as a layer to be used for transmission to the terminal device, and the reception processing unit 247 which decodes a signal transmitted on the at least one layer in the frequency band.

Accordingly, a burden of scheduling in non-orthogonal multiple access, for example, can be further reduced.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although non-orthogonal multiple access using power allocation (more specifically, non-orthogonal multiple access using SPC) has been described as an example of non-orthogonal multiple access, for example, the present disclosure is not limited thereto. For example, IDMA, SCMA, and the like may be applied as non-orthogonal multiple access.

In addition, although the embodiments have been described on the basis of the technology of LTE/LTE-A, for example, the present disclosure is not limited thereto. Although the example in which channels decided for LTE/LTE-A (e.g., a PDCCH, a PDSCH and/or BMCH) are used has been described as an example, other channels (channels with other names) may be used.

In addition, processing steps in processes of the present specification may not necessarily be executed in, for example, a time series manner in the order described in the flowcharts or sequence diagrams. The processing steps in the processes may also be executed in, for example, a different order from the order described in the flowcharts or sequence diagrams, or may be executed in parallel.

In addition, a computer program for causing a processor (for example, a CPU, a DSP, or the like) provided in a device of the present specification (for example, a base station, a base station device or a module for a base station device, or a terminal device or a module for a terminal device) to function as a constituent element of the device (for example, the selection unit, the notification unit, the transmission processing unit, the transmission processing unit, the reception processing unit, the information acquisition unit, and/or the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station device or a module for a base station device, or a terminal device or a module for a terminal device) may also be provided. In addition, a method including an operation of the constituent element of the device (for example, the selection unit, the notification unit, the transmission processing unit, the transmission processing unit, the reception processing unit, the information acquisition unit, and/or the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An apparatus including:

a selection unit configured to select a frequency band to which non-orthogonal multiple access is applied and at least one layer among a plurality of layers that are to be multiplexed in the frequency band for the non-orthogonal multiple access, as a band and a layer to be used for transmission to a terminal device; and a notification unit configured to notify the terminal device of the frequency band and the at least one layer.

(2)

The apparatus according to (1), in which the non-orthogonal multiple access is non-orthogonal multiple access using power allocation, and the plurality of layers are a plurality of layers that are to be multiplexed in the frequency band using power allocation.

(3)

The apparatus according to (2), in which the non-orthogonal multiple access is non-orthogonal multiple access using superposition coding (SPC).

(4)

The apparatus according to (2) or (3), in which the selection unit selects the frequency band and a layer to which maximum power is allocated among the plurality of layers, as a band and a layer to be used for transmission to another terminal device that does not support the non-orthogonal multiple access, and the notification unit notifies the other terminal device of the frequency band.

(5)

The apparatus according to any one of (1) to (4), in which the terminal device is a terminal device that supports the non-orthogonal multiple access.

(6)

The apparatus according to any one of (1) to (5), in which the frequency band is a component carrier, and the selection unit selects the frequency band as a secondary component carrier to be used for transmission to the terminal device, and selects the at least one layer as a layer to be used for transmission to the terminal device in the secondary component carrier.

(7)

The apparatus according to any one of (1) to (5), in which the selection unit selects the frequency band as a band of a handover destination of the terminal device, and selects the at least one layer as a layer to be used for transmission to the terminal device in the band of the handover destination.

(8)

The apparatus according to any one of (1) to (7), in which the selection unit re-selects another layer among the plurality of layers as a layer to be used for transmission to the terminal device, and the notification unit notifies the terminal device of the other layer.

(9)

The apparatus according to any one of (1) to (8), in which the at least one layer is one layer among the plurality of layers.

(10)

The apparatus according to any one of (1) to (19), further including:

a transmission processing unit configured to transmit a signal in the frequency band, in which the transmission processing unit transmits a signal of a physical data channel on each of the plurality of layers in the frequency band.

(11)

The apparatus according to (10), in which the transmission processing unit transmits a signal of the physical control channel on one layer of the plurality of layers or without multiplexing in the frequency band.

(12)

The apparatus according to (11), in which the signal of the physical control channel includes a signal of scheduling information with respect to each of the plurality of layers.

(13)

The apparatus according to (10), in which the transmission processing unit transmits a signal of a physical control channel on each of the plurality of layers in the frequency band.

(14)

The apparatus according to any one of (1) to (13), in which the plurality of layers include a first layer of which a length of a time frame is a first length and a second layer of which a length of a time frame is a second length that is shorter than the first length.

(15)

The apparatus according to (14), in which the first length is equal to a length of a time frame of another frequency band to which the non-orthogonal multiple access is not applied.

(16)

The apparatus according to (14) or (15), further including:

a transmission processing unit configured to transmit a signal in the frequency band, in which the transmission processing unit transmits a signal of data having a lower real-time property on the first layer and a signal of data having a higher real-time property on the second layer in the frequency band.

(17)

The apparatus according to (14) or (15), in which the time frame is a subframe.

(18)

A method that is performed by a processor, the method including:

selecting a frequency band to which non-orthogonal multiple access is applied and at least one layer among a plurality of layers that are to be multiplexed in the frequency band for the non-orthogonal multiple access, as a band and a layer to be used for transmission to a terminal device; and notifying the terminal device of the frequency band and the at least one layer.

(19)

An apparatus including:

an acquisition unit configured to acquire band information indicating a frequency band that is a frequency band to which non-orthogonal multiple access is applied and selected as a band to be used for transmission to a terminal device, and layer information indicating at least one layer which is at least one layer among a plurality of layers that are to be multiplexed in the frequency band for the non-orthogonal multiple access and selected as a layer to be used for transmission to the terminal device; and a reception processing unit configured to decode a signal to be transmitted on the at least one layer in the frequency band.

(20)

The apparatus according to (19), further including:

a notification unit configured to notify a base station of capability information indicating that the terminal device supports the non-orthogonal multiple access.

(21)

The apparatus according to any one of (1) to (17), in which the apparatus is a base station, a base station apparatus for the base station, or a module for the base station apparatus.

(22)

The apparatus according to (19) or (20), in which the apparatus is the terminal device or a module for the terminal device.

(23)

A program causing a processor to execute:

selecting a frequency band to which non-orthogonal multiple access is applied and at least one layer among a plurality of layers that are to be multiplexed in the frequency band for the non-orthogonal multiple access, as a band and a layer to be used for transmission to a terminal device; and notifying the terminal device of the frequency band and the at least one layer.

(24)

A readable storage medium having a program stored therein, the program causing a processor to execute:

selecting a frequency band to which non-orthogonal multiple access is applied and at least one layer among a plurality of layers that are to be multiplexed in the frequency band for the non-orthogonal multiple access, as a band and a layer to be used for transmission to a terminal device; and notifying the terminal device of the frequency band and the at least one layer.

(25)

A method including:

acquiring band information indicating a frequency band that is a frequency band to which non-orthogonal multiple access is applied and selected as a band to be used for transmission to a terminal device, and layer information indicating at least one layer which is at least one layer among a plurality of layers that are to be multiplexed in the frequency band for the non-orthogonal multiple access and selected as a layer to be used for transmission to the terminal device; and decoding a signal to be transmitted on the at least one layer in the frequency band.

(26)

A program causing a processor to execute:

acquiring band information indicating a frequency band that is a frequency band to which non-orthogonal multiple access is applied and selected as a band to be used for transmission to a terminal device, and layer information indicating at least one layer which is at least one layer among a plurality of layers that are to be multiplexed in the frequency band for the non-orthogonal multiple access and selected as a layer to be used for transmission to the terminal device; and decoding a signal to be transmitted on the at least one layer in the frequency band.

(27)

A readable storage medium having a program stored therein, the program causing a processor to execute:

acquiring band information indicating a frequency band that is a frequency band to which non-orthogonal multiple access is applied and selected as a band to be used for transmission to a terminal device, and layer information indicating at least one layer which is at least one layer among a plurality of layers that are to be multiplexed in the frequency band for the non-orthogonal multiple access and selected as a layer to be used for transmission to the terminal device; and decoding a signal to be transmitted on the at least one layer in the frequency band.

REFERENCE SIGNS LIST

1 system
100 base station
151 selection unit
153 notification unit
155 transmission processing unit
157 reception processing unit
200 terminal device
241 information acquisition unit
243 notification unit
245 transmission processing unit
247 reception processing unit

The invention claimed is:

1. An apparatus comprising:
circuitry configured to
select a frequency band to which non-orthogonal multiple access is applied and at least one non-orthogonal multiple access (NOMA) resource among a plurality of NOMA resources that are to be multiplexed in the frequency band for the non-orthogonal multiple access, as a band and a NOMA resource to be used for transmission from a terminal device; and
notify the terminal device of the frequency band and the at least one NOMA resource.

2. The apparatus according to claim 1,
wherein the non-orthogonal multiple access is non-orthogonal multiple access using interleave division multiple access (IDMA), and
the plurality of NOMA resources are a plurality of NOMA resources that are to be multiplexed in the frequency band using IDMA.

3. The apparatus according to claim 2, wherein the non-orthogonal multiple access is non-orthogonal multiple access using IDMA.

4. The apparatus according to claim 2,
wherein the circuitry is further configured to
select the frequency band and a NOMA resource to which maximum power is allocated among the plurality of NOMA resources, as a band and a NOMA resource to be used for transmission to another terminal device that does not support the non-orthogonal multiple access, and
notify the other terminal device of the frequency band.

5. The apparatus according to claim 1, wherein the terminal device is a terminal device that supports the non-orthogonal multiple access.

6. The apparatus according to claim 1,
wherein the frequency band is at least a part of a component carrier, and
the circuitry is configured to select the frequency band as a secondary component carrier to be used for transmission to the terminal device, and select the at least one NOMA resource as a NOMA resource to be used for transmission to the terminal device in the secondary component carrier.

7. The apparatus according to claim 1, wherein the circuitry is configured to select the frequency band as a band of a handover destination of the terminal device, and select the at least one NOMA resource as a NOMA resource to be used for transmission to the terminal device in the band of the handover destination.

8. The apparatus according to claim 1,
wherein the circuitry is configured to
re-select another NOMA resource among the plurality of NOMA resources as a NOMA resource to be used for transmission to the terminal device, and
notify the terminal device of the other NOMA resource.

9. The apparatus according to claim 1, wherein the at least one NOMA resource is one NOMA resource among the plurality of NOMA resources.

10. The apparatus according to claim 1, further comprising:
a transmission processor configured to transmit a signal in the frequency band,
wherein the transmission processor transmits a signal of a physical data channel on each of the plurality of NOMA resources in the frequency band.

11. The apparatus according to claim 10, wherein the transmission processor transmits a signal of the physical control channel on one NOMA resource of the plurality of NOMA resources or without multiplexing in the frequency band.

12. The apparatus according to claim 11, wherein the signal of the physical control channel includes a signal of scheduling information with respect to each of the plurality of NOMA resources.

13. The apparatus according to claim 10, wherein the transmission processor transmits a signal of a physical control channel on each of the plurality of NOMA resources in the frequency band.

14. The apparatus according to claim 1, wherein the plurality of NOMA resources include a first NOMA resource of which a length of a time frame is a first length and a second NOMA resource of which a length of a time frame is a second length that is shorter than the first length.

15. The apparatus according to claim 14, wherein the first length is equal to a length of a time frame of another frequency band to which the non-orthogonal multiple access is not applied.

16. The apparatus according to claim 14, further comprising:
a transmission processor configured to transmit a signal in the frequency band,
wherein the transmission processor transmits a signal of data having a lower real-time property on the first NOMA resource and a signal of data having a higher real-time property on the second NOMA resource in the frequency band.

17. The apparatus according to claim 14, wherein the time frame is a subframe.

18. A method that is performed by a processor, the method comprising:
selecting a frequency band to which non-orthogonal multiple access is applied and at least one non-orthogonal multiple access (NOMA) resource among a plurality of NOMA resources that are to be multiplexed in the frequency band for the non-orthogonal multiple access, as a band and a NOMA resource to be used for transmission to a terminal device; and
notifying the terminal device of the frequency band and the at least one NOMA resource.

19. An apparatus comprising:
circuitry configured to
acquire band information indicating a frequency band that is a frequency band to which non-orthogonal multiple access (NOMA) is applied and selected as a band to be used for transmission from a terminal device, and NOMA resource information indicating at least one NOMA resource which is at least one NOMA resource among a plurality of NOMA resources that are to be multiplexed in the frequency band for the non-orthogonal multiple access and selected as a NOMA resource to be used for transmission from the terminal device; and
transmit a signal to be transmitted on the at least one NOMA resource in the frequency band.

20. The apparatus according to claim 19, wherein the circuitry is further configured to
notify a base station of capability information indicating that the terminal device supports the non-orthogonal multiple access.

* * * * *